United States Patent
Katayama et al.

(10) Patent No.: US 10,750,048 B2
(45) Date of Patent: Aug. 18, 2020

(54) PRINTING APPARATUS AND CONTROL METHOD OF PRINTING APPARATUS INCLUDING A CARRIAGE CONFIGURED TO MOUNT A PRINT HEAD AND A CAMERA FOR CAPTURING AN IMAGE OF A CHART PRINTED ON A TRANSPORTED PRINT MEDIUM

(71) Applicant: SEIKO EPSON CORPORATION, Tokyo (JP)

(72) Inventors: Shigenori Katayama, Okaya (JP); Tetsuo Tatsuda, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/986,522

(22) Filed: May 22, 2018

(65) Prior Publication Data
US 2018/0343360 A1   Nov. 29, 2018

(30) Foreign Application Priority Data
May 24, 2017  (JP) .................. 2017-102700

(51) Int. Cl.
*H04N 1/00* (2006.01)
*H04N 1/387* (2006.01)
(Continued)

(52) U.S. Cl.
CPC ....... *H04N 1/3871* (2013.01); *H04N 1/00037* (2013.01); *H04N 1/00045* (2013.01);
(Continued)

(58) Field of Classification Search
USPC .......... 355/407, 408, 18, 126; 358/1.1–3.29, 358/1.11–1.18, 501–505, 520–537;
(Continued)

(56) References Cited

U.S. PATENT DOCUMENTS

2003/0103145 A1 * 6/2003 Ejima ............... H04N 1/00005
348/207.2
2003/0193034 A1   10/2003 Tullis et al.
(Continued)

FOREIGN PATENT DOCUMENTS

JP     04-028552 A    1/1992
JP     2005-529313 A  9/2005
(Continued)

*Primary Examiner* — Marcellus J Augustin
(74) *Attorney, Agent, or Firm* — Foley & Lardner LLP

(57) ABSTRACT

There is provided a printing apparatus including: an ink jet head that prints on a print medium; a camera that captures an image on the print medium; a carriage that mounts the ink jet head and the camera; and a processor that generates image data based on a captured image obtained by capturing a chart by the camera, the chart being printed on the print medium by the ink jet head, in which the processor generates at least one of image data representing an image of an image range smaller than a capturing range of the camera and image data representing an image of a resolution lower than a resolution of the captured image, for an adjustment item.

18 Claims, 13 Drawing Sheets

(51) Int. Cl.
*H04N 1/60* (2006.01)
*H04N 1/195* (2006.01)
*H04N 1/40* (2006.01)

(52) U.S. Cl.
CPC ..... *H04N 1/00251* (2013.01); *H04N 1/00652* (2013.01); *H04N 1/19594* (2013.01); *H04N 1/6041* (2013.01); *H04N 1/6044* (2013.01); *H04N 1/3872* (2013.01); *H04N 1/40068* (2013.01); *H04N 1/6094* (2013.01)

(58) Field of Classification Search
USPC ........... 396/20–56; 399/9–18, 29, 30, 45–49, 399/58–66, 72
See application file for complete search history.

(56) References Cited

U.S. PATENT DOCUMENTS

| | | | |
|---|---|---|---|
| 2005/0226500 A1 | 10/2005 | Sasaki et al. | |
| 2007/0041028 A1* | 2/2007 | Seko | H04N 1/6058 358/1.9 |
| 2009/0267982 A1 | 10/2009 | Horii et al. | |
| 2011/0169893 A1* | 7/2011 | Takafuji | B41J 3/28 347/49 |
| 2012/0050376 A1 | 3/2012 | Nagoshi et al. | |
| 2012/0218336 A1 | 8/2012 | Okada et al. | |
| 2013/0235115 A1 | 9/2013 | Nagoshi et al. | |
| 2016/0171348 A1* | 6/2016 | Satoh | H04N 1/00251 347/110 |
| 2016/0366288 A1* | 12/2016 | Sasa | G01J 3/0291 |
| 2018/0183998 A1* | 6/2018 | Menachem | H04N 5/23232 |

FOREIGN PATENT DOCUMENTS

| | | |
|---|---|---|
| JP | 2005-286879 A | 10/2005 |
| JP | 2008-182352 A | 8/2008 |
| JP | 2009-233967 A | 10/2009 |
| JP | 2009-262457 A | 11/2009 |
| JP | 2012-051241 A | 3/2012 |
| JP | 2012-187912 A | 10/2012 |

* cited by examiner

PRINTING APPARATUS AND CONTROL METHOD OF PRINTING APPARATUS INCLUDING A CARRIAGE CONFIGURED TO MOUNT A PRINT HEAD AND A CAMERA FOR CAPTURING AN IMAGE OF A CHART PRINTED ON A TRANSPORTED PRINT MEDIUM

This application claims priority under 35 U.S.C. § 119 to Japanese Patent Application No. 2017-102700 filed on May 24, 2017, the entire disclosure of which is expressly incorporated by reference herein.

BACKGROUND

1. Technical Field

The present invention relates to a printing apparatus and a control method of the printing apparatus.

2. Related Art

In the related art, a printing apparatus (an image forming apparatus) that acquires (detects) a detection chart (print state) printed on a print medium and executes various adjustments based on the acquired pattern is known (for example, refer to JP-A-2009-262457). JP-A-2009-262457 discloses an image forming apparatus that includes a sensor detecting a print state printed on a print medium and corrects print data in synchronization with printing based on the print state detected by the sensor.

On the other hand, as a method of acquiring the detection chart, there is a method of capturing an image of the detection chart by a camera and acquiring the captured image as the detection chart. However, the captured image which is captured by the camera may have a large data amount. As a result, a time required for data transmission or the like may increase, and in a configuration in which the detection chart is acquired by the camera, a time required for adjustment based on the detection chart may increase.

SUMMARY

An advantage of some aspects of the invention is to shorten a time required for adjustment based on the detection chart.

According to an aspect of the invention, there is provided a printing apparatus including: a print head configured to print on a print medium; a camera configured to capture an image on the print medium; a carriage configured to mount the print head and the camera; and a processor configured to generate image data based on a captured image obtained by capturing a chart (detection chart) by the camera, the chart being printed on the print medium by the print head, wherein the processor configured to generate at least one of image data representing an image of an image range smaller than a capturing range of the camera and image data representing an image of a resolution lower than a resolution of the captured image, for an adjustment item related to printing.

In this configuration, at least one of image data representing an image of an image range smaller than a capturing range of the camera and image data representing an image of a resolution lower than a resolution of the captured image is generated for the of adjustment item. Thus, it is possible to reduce a data amount of the image data of the chart for the adjustment item related to printing. Therefore, it is possible to shorten a time required for adjustment based on the chart.

In the printing apparatus, preferably, the camera configured to include an image sensor and a camera processor, the image sensor configured to generate captured image data representing the captured image and output the captured image data to the camera processor, the camera processor configured to generate output image data to be output to the processor based on the captured image data and outputs the output image data to the processor, and the processor configured to generate generation image data for generating a parameter to be used for adjustment according to the adjustment item based on the output image data.

In this configuration, the image sensor generates captured image data and outputs the captured image data to the camera processor, the camera processor generates output image data and outputs the output image data to the processor, and the processor generates generation image data. Therefore, at least one of when the image sensor generates the captured image data, when the camera processor generates the output image data, and when the processor generates the generation image data, it is possible to reduce the data amount of the image data.

In the printing apparatus, preferably, the processor configured to generate the generation image data based on the image range or the resolution which is set to be different for the adjustment item.

In this configuration, the generation image data is generated based on the image range or the resolution which is set to be different for the adjustment item. Thus, it is possible to reduce the data amount of the image data of the chart for the adjustment item. Therefore, it is possible to shorten a time required for adjustment based on the chart.

In the printing apparatus, preferably, the processor configured to generate the output image data based on the image range or the resolution which is set to be different for the adjustment item.

In this configuration, the output image data is generated based on the image range or the resolution which is set to be different for the adjustment item. Thus, it is possible to reduce the data amount of the image data of the chart for the adjustment item. Therefore, it is possible to shorten a time required for adjustment based on the chart.

In the printing apparatus, preferably, the processor configured to generate the captured image data based on the image range or the resolution which is set to be different for the adjustment item.

In this configuration, the captured image data is generated based on the image range or the resolution which is set to be different for the adjustment item. Thus, it is possible to reduce the data amount of the image data of the chart for the adjustment item. Therefore, it is possible to shorten a time required for adjustment based on the chart.

In the printing apparatus, preferably, the camera processor configured to cause the camera to capture an image of the chart based on a frame rate which is set to be different for the adjustment item.

In this configuration, the camera processor causes the camera to capture an image of the chart based on a frame rate which is set to be different for the adjustment item. Thus, it is possible to capture an image of the chart at a frame rate according to the adjustment item. Therefore, it is possible to shorten a time required for adjustment based on the chart.

In the printing apparatus, preferably, the print head configured to include a nozzle for ejecting an ink, and the processor configured to adjust at least one of a timing of ejecting the ink from the nozzle and an amount of the ink ejected from the nozzle, based on the parameter which is generated based on the generation image data. In this configuration, at least one of a timing of ejecting the ink from the nozzle and an amount of the ink ejected from the nozzle is adjusted based on the parameter which is generated based on the generation image data with a reduced data amount. Therefore, it is possible to shorten a time required for adjustment.

Preferably, the printing apparatus further includes a transport mechanism configured to transport the print medium, and the processor configured to adjust a transport amount of the print medium by the transport mechanism based on the parameter which is generated based on the generation image data.

In this configuration, at least a transport amount of the print medium by the transport mechanism is adjusted based on the parameter which is generated based on the generation image data with a reduced data amount. Therefore, it is possible to shorten a time required for transport amount adjustment.

According to another aspect of the invention, there is provided a control method of a printing apparatus configured to include a carriage, the carriage mounting a print head which prints on a print medium and a camera which captures an image on the print medium, the method including: generating at least one of image data representing an image of an image range smaller than a capturing range of the camera and image data representing an image of a resolution lower than a resolution of a captured image, based on the captured image obtained by capturing an image of a chart by the camera, for an adjustment item related to printing, the chart being printed on the print medium by the print head.

In this configuration, at least one of image data representing an image of an image range smaller than a capturing range of the camera and image data representing an image of a resolution lower than a resolution of the captured image is generated for the adjustment item related to printing. Thus, it is possible to reduce a data amount of the image data of the chart for the adjustment item. Therefore, it is possible to shorten a time required for adjustment based on the chart.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
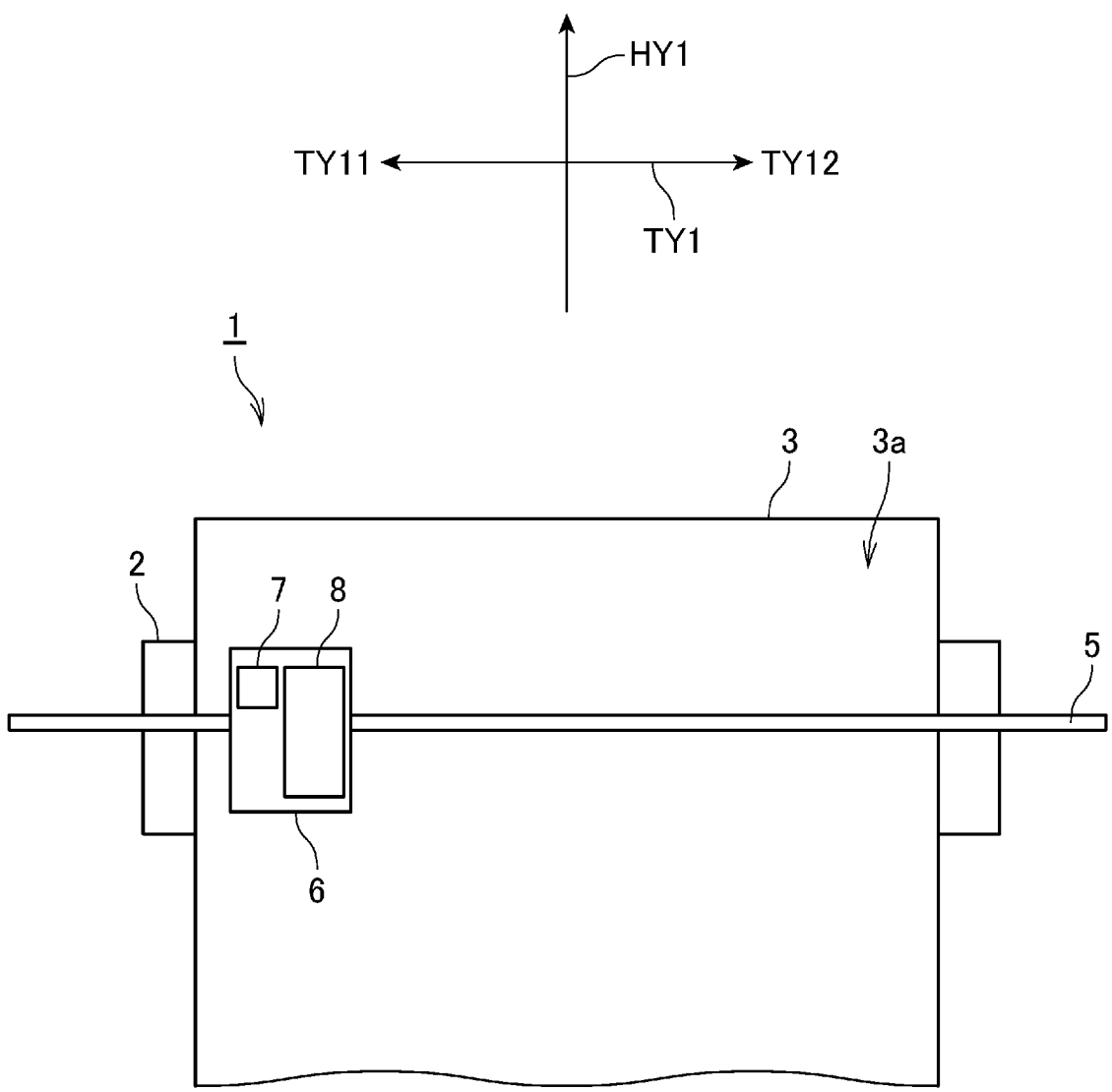
FIG. 1 is a schematic diagram illustrating a printing apparatus.

FIG. 1 is a schematic diagram illustrating a printing apparatus 1.

The printing apparatus 1 is an apparatus into which a print medium 3 is loaded and which has a function of executing printing on the loaded print medium 3 based on print data received from an external apparatus such as a host computer or print data stored in the printing apparatus 1.

Figure 4:
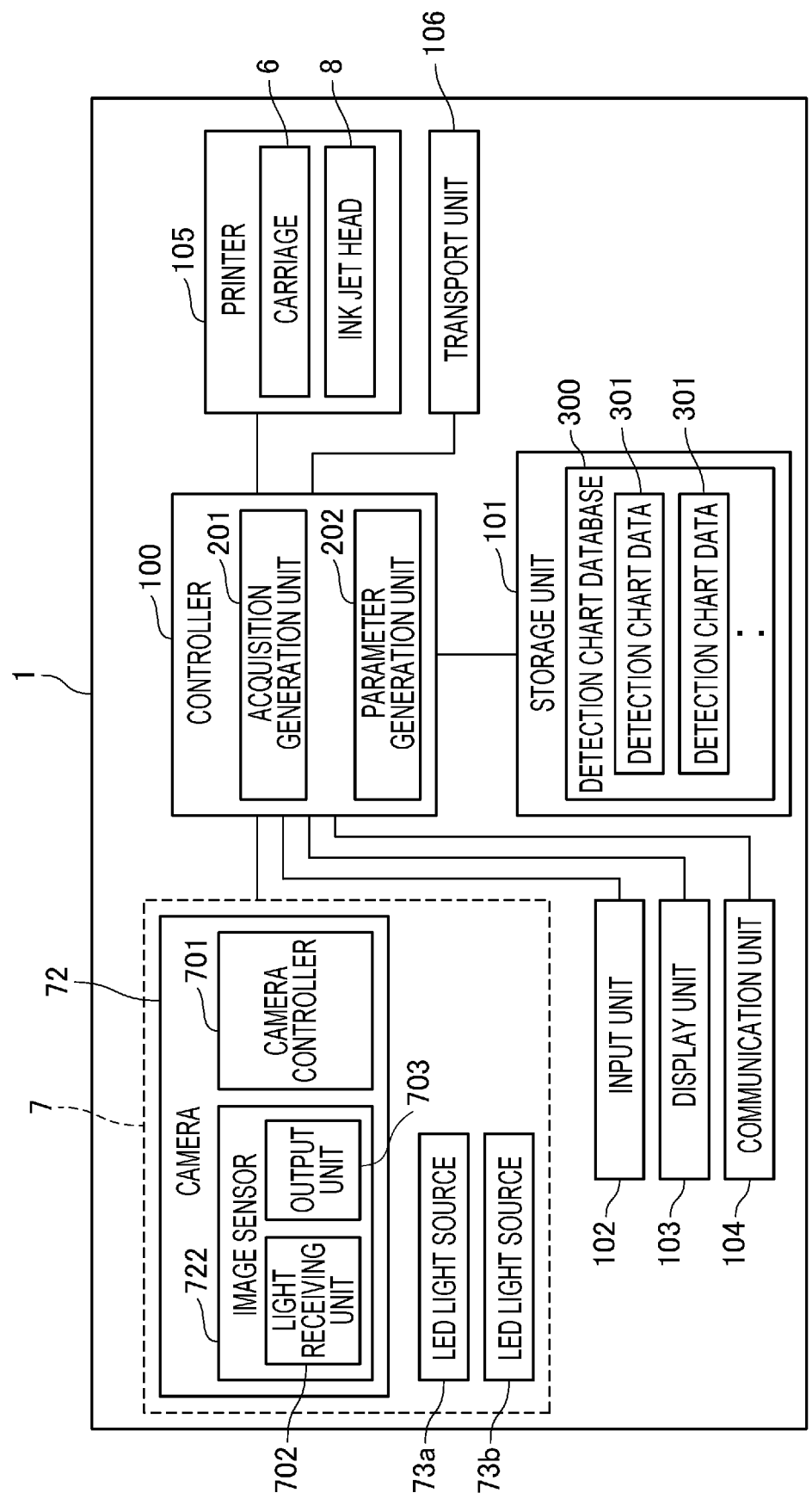
FIG. 4 is a diagram illustrating a functional configuration of the printing apparatus.

As illustrated in FIG. 1, the printing apparatus 1 includes a platen 2. A predetermined print medium 3 is transported on an upper surface of the platen 2 in a transport direction HY1 by a transport mechanism (transport unit) 106 (FIG. 4).

The print medium 3 is not limited to a paper medium, and means a medium such as a film or a fiber which can be loaded into the printing apparatus 1 and on which printing can be performed by the printing apparatus 1. The printing apparatus 1 according to the present embodiment is an ink jet printer that prints characters, images, and the like by forming dots by ejecting an ink onto the loaded print medium 3 using an ink jet head 8 (print head). In particular, the printing apparatus 1 according to the present embodiment is a so-called large format printer (LFP), and a large medium as the print medium 3 can be loaded into the printing apparatus 1. As an example of the print medium 3, in a case of cut paper, an "A0" size paper sheet can be loaded into the printing apparatus 1, and in a case of roll paper, a paper sheet having a width more than "900 mm" can be loaded into the printing apparatus 1.

A guide shaft 5 is provided above the platen 2, the guide shaft 5 extending in a perpendicular direction TY1 perpendicular to the transport direction HY1 of the print medium 3. A carriage 6 is provided on the guide shaft 5 so as to reciprocate along the guide shaft 5 by a drive mechanism. That is, the carriage 6 reciprocates along the guide shaft 5 in the perpendicular direction TY1. The perpendicular direction TY1 corresponds to a moving direction of the carriage 6.

A camera module (camera unit) 7 and an ink jet head 8 are mounted on the carriage 6 by being disposed side by side in the perpendicular direction TY1. In FIG. 1, the camera module 7 is disposed on the carriage 6 closer to a direction TY11 (the other movement direction of the carriage 6) than the ink jet head 8 is. In addition, the ink jet head 8 is disposed on the carriage 6 closer to a direction TY12 (one movement direction of the carriage 6) than the camera module 7 is. The camera module 7 will be described later.

Figure 2:
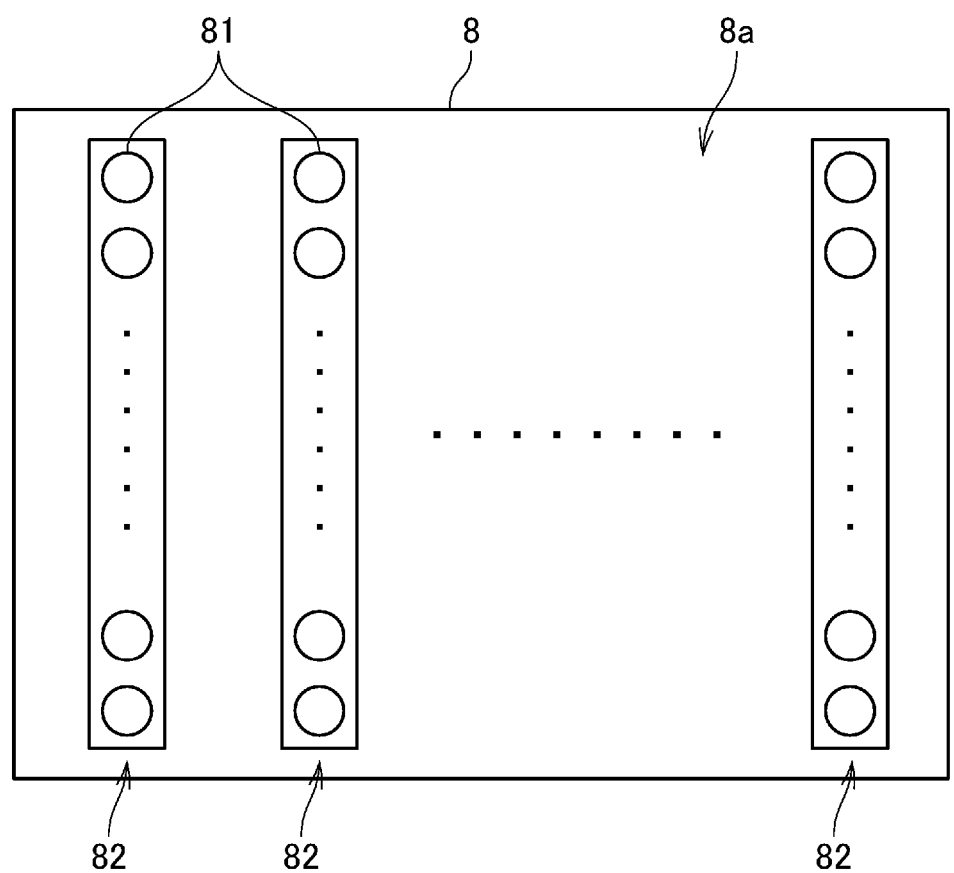
FIG. 2 is a diagram for explaining an ink jet head.

FIG. 2 is a diagram for explaining the ink jet head 8.

The ink jet head 8 includes a plurality of nozzle lines 82 formed by disposing a plurality of nozzles 81 which ejects an ink side by side in the transport direction HY1 on an ink ejection surface 8a facing a print surface 3a of the print medium 3. As illustrated in FIG. 2, the ink jet head 8 includes the plurality of nozzle lines 82 disposed side by side in the perpendicular direction TY1. The nozzles 81 included in the nozzle line 82 are disposed at regular intervals along the transport direction HY1. The ink jet head 8 includes the nozzle lines 82 for each color ink to be ejected onto the print medium 3. For example, in a case where colors of inks to be ejected are colors of cyan, magenta, yellow, light cyan, light magenta, gray, light gray, matte black, and photo black, the ink jet head 8 includes ten nozzle lines 82.

Returning to the explanation of FIG. 1, in the present embodiment, it is assumed that the direction TY12 in the printing apparatus 1 is a side on which a maintenance mechanism that performs maintenance such as cleaning of sucking an ink from an opening of the nozzle 81 is disposed (hereinafter, referred to as a "home position side"). On the other hand, in the present embodiment, it is assumed that the direction TY11 in the printing apparatus 1 is a side opposite to the home position side (hereinafter, referred to as "full side").

In a case where the maintenance mechanism is positioned in the direction TY11, where the direction TY11 is the home position side, and where the direction TY12 is the full side, the camera module 7 is disposed on the carriage 6 closer to the direction TY12 than the ink jet head 8 is.

In this manner, the camera module 7 is disposed on the carriage 6 closer to a side that is not the home position side than the ink jet head 8 is. Thereby, the camera module 7 does not interfere with the maintenance mechanism, and thus it is possible to prevent mist of the ink from adhering to the camera module 7. Therefore, it is possible to prevent a degradation in function of the camera module 7.

Next, the camera module 7 will be described.

Figure 3:
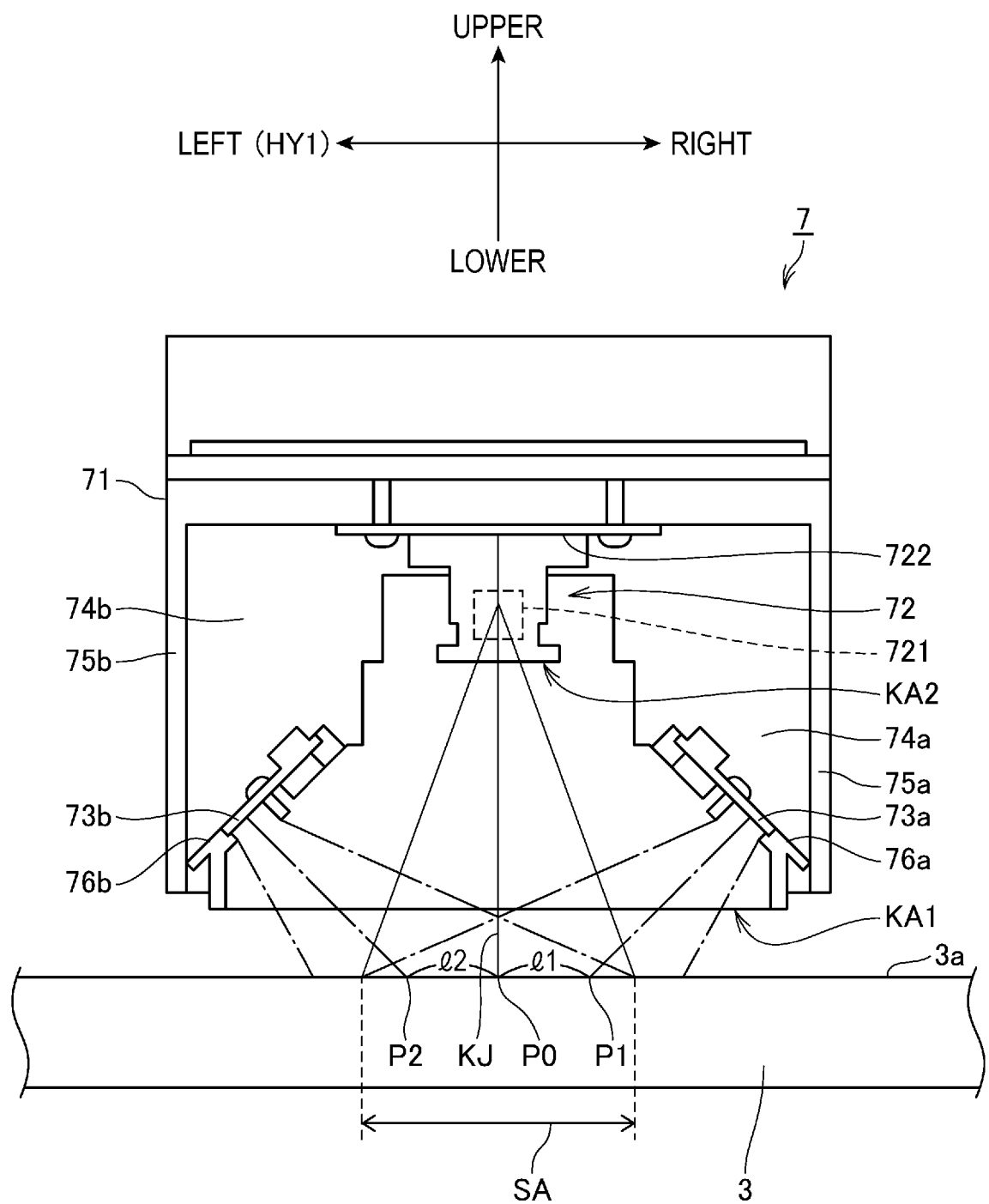
FIG. 3 is a diagram illustrating a configuration of a main portion of a camera module.

FIG. 3 is a diagram illustrating a configuration of a main portion of the camera module 7.

In an explanation of FIG. 3, as represented by arrows, it is assumed that a direction toward the left in FIG. 3 is a "left side". In addition, it is assumed that a direction toward the right in FIG. 3 is a "right side". In addition, it is assumed that a direction toward the upper in FIG. 3 is an "upper side". In addition, it is assumed that a direction toward the lower in FIG. 3 is a "lower side". The left side corresponds to the transport direction HY1.

As illustrated in FIG. 3, the camera module 7 is configured to include a housing 71, a camera 72, an LED light source 73*a* (light source), and an LED light source 73*b* (light source).

The housing 71 accommodates the camera 72, the LED light source 73*a*, and the LED light source 73*b*. The housing 71 is made of a material such as aluminum having a light weight and high thermal conductivity, and an opening KA1 is formed on a lower surface of the housing 71.

The camera 72 is disposed on an upper side of the inside of the housing 71. The camera 72 includes a lens (lens unit) 721 and an image sensor 722. In addition, an opening KA2 is formed on a lower end of the camera 72. The image sensor 722 is configured with an RGB image sensor including a plurality of pixels, and receives light via the opening KA1, the opening KA2, and the lens 721, the light with which a capturing area SA on the print surface 3*a* of the print medium 3 is irradiated and which is reflected from the capturing area SA. The image sensor 722 outputs an electrical signal corresponding to an intensity of the reflected light that is received by each pixel. In addition, the image sensor 722 captures an image of the capturing range SA on the print surface 3*a* of the print medium 3. The capturing range SA is referred to as a generic term when describing one capturing range without distinguishing a capturing range SA1, a capturing range SA2, a capturing range SA3, and a capturing range SA4 to be described in the following description. The image sensor 722 is disposed such that an optical axis KJ of the reflected light to be received passes through the center point of the opening KA2 and the center point of the opening KA1.

The lens 721 forms an image by the reflected light, which is reflected from the capturing range SA on the print surface 3*a* of the print medium 3, on the image sensor 722, and is configured with, for example, a combination of a plurality of lenses. The lens 721 is disposed such that an optical axis of the lens 721 matches the optical axis KJ.

The camera module 7 includes a light source fixing member 74*a* which is disposed on the right side inside the housing 71 and a light source fixing member 74*b* which is disposed on the left side inside the housing 71. A right end of the light source fixing member 74*a* is fixed to a right wall portion 75*a* of the housing 71, and an inclined portion 76*a* inclined with respect to the optical axis KJ is formed on a left end of the light source fixing member 74*a*. On the other hand, a left end of the light source fixing member 74*b* is fixed to a left wall portion 75*b* of the housing 71, and an inclined portion 76*b* inclined with respect to the optical axis KJ is formed on a right end of the light source fixing member 74*b*.

The LED light source 73*a* is disposed on the inclined portion 76*a* of the light source fixing member 74*a*. As illustrated in FIG. 3, the inclined portion 76*a* of the light source fixing member 74*a* is inclined such that an optical axis of light emitted from the LED light source 73*a* is positioned at a position P1 away from an intersection point P0 between the optical axis KJ and the print medium 3 to the right side by a predetermined distance l1. On the other hand, the LED light source 73*b* is disposed on the inclined portion 76*b* of the light source fixing member 74*b*. As illustrated in FIG. 3, the inclined portion 76*b* of the light source fixing member 74*b* is inclined such that an optical axis of light emitted from the LED light source 73*b* is positioned at a position P2 away from the intersection point P0 to the left side by a predetermined distance l2. An inclination of the light source fixing member 74*a* and an inclination of the light source fixing member 74*b* may be fixed, or may be changed by a predetermined mechanism. In this manner, the light source fixing member 74*a* and the light source fixing member 74*b* are inclined, and thus the LED light source 73*a* and the LED light source 73*b* irradiate the print surface 3*a* of the print medium 3 with light at a predetermined angle (for example, 45°).

As described above, the LED light source 73*a* irradiates the print surface 3*a* with light at a predetermined angle toward the position P1 positioned rightward from the intersection point P0 by the predetermined distance l1. Therefore, around the position P1, the print surface 3*a* of the print medium 3 is irradiated with light of which a light intensity decreases as a distance from the position P1 increases. On the other hand, the LED light source 73*b* irradiates the print surface 3*a* with light at a predetermined angle toward the position P2 positioned leftward from the intersection point P0 by the predetermined distance l2. Therefore, around the position P2, the print surface 3*a* of the print medium 3 is irradiated with light of which a light intensity decreases as a distance from the position P2 increases. Accordingly, the predetermined distance l1 and the predetermined distance l2 are appropriately set such that the capturing range SA is irradiated with light having a uniform light intensity. As the position P1 and the position P2 are positioned closer to the intersection point P0, in an upstream portion and a downstream portion of the capturing range SA in the transport direction HY1, the irradiation light intensity is decreased, and as a result, brightness unevenness occurs. On the other hand, as the position P1 and the position P2 are positioned farther from the intersection point P0, in the upstream portion and the downstream portion of the capturing range SA in the transport direction HY1, the irradiation light intensity is decreased, and as a result, brightness unevenness occurs. Therefore, the predetermined distance l1 and the predetermined distance l2 are appropriately set such that brightness unevenness does not occur.

In the following description, image data represents data of an image obtained by capturing by the camera 72. Therefore, the image data includes image data representing a captured image, image data representing an image which is cut out from a captured image and is transmitted, and the like. In the present embodiment, in a case where the image data is simply referred to as an image, the image is not limited to a captured image, and also includes an image cut out from a captured image.

Next, a functional configuration of the printing apparatus 1 will be described.

FIG. 4 is a diagram illustrating a functional configuration of the printing apparatus 1.

As illustrated in FIG. 4, the printing apparatus 1 includes a controller 100, a storage (storage unit or memory) 101, an input device (input unit, input circuit or input board) 102, a display (display unit) 103, a communicator (communication unit, communication circuit or communication board) 104, the camera module 7, a printer 105, and a transport mechanism (transport unit) 106.

The controller 100 includes a CPU (processor), a ROM (memory), a RAM, an ASIC, a signal processing circuit, and the like, and controls each component of the printing apparatus 1. In the controller 100, the CPU executes processing by, for example, reading a program such as firmware stored in the ROM or the storage 101 (a memory) to be described, executes processing by, for example, a function implemented in the ASIC, and executes processing by, for example, cooperation of hardware and software such as signal processing by a signal processing circuit. The controller 100 functions as an acquisition generator (acquisition generation unit) 201 (to be described) and a parameter generator (parameter generation unit) 202 (to be described) by reading and executing a control program stored in the ROM, the storage 101, or the like.

The storage 101 includes a nonvolatile memory such as a hard disk or an EEPROM, and stores various data so as to be rewritable. In addition, the storage 101 stores a detection chart database 300. The detection chart database 300 is a database that stores a plurality of pieces of detection chart data 301, and stores the pieces of detection chart data 301 corresponding to the number of adjustment items that are items related to printing by the printing apparatus 1. The detection chart data 301 is data for printing a pattern image which is detected when executing adjustment of the printing apparatus 1.

In the present embodiment, the adjustment related to printing by the printing apparatus 1 includes at least ejection timing adjustment for adjusting an ejection timing of the ink onto the print surface 3a of the print medium 3, ejection amount adjustment for adjusting an ejection amount of the ink onto the print surface 3a of the print medium 3, density unevenness adjustment for adjusting density unevenness, and transport amount adjustment for adjusting a transport amount when transporting the print medium 3 in the transport direction HY1. Therefore, in the present embodiment, the adjustment items are at least four items, and the detection chart database 300 stores at least four pieces of detection chart data 301. That is, in the present embodiment, the detection chart database 300 stores at least the detection chart data 301 for the ejection timing adjustment, the detection chart data 301 for the ejection amount adjustment, the detection chart data 301 for the density unevenness adjustment, and the detection chart data 301 for the transport amount adjustment.

The input device 102 includes an input device such as an operation panel or a touch panel provided in the printing apparatus 1, detects a user's operation on the input device, and outputs the detected operation to the controller 100. The controller 100 executes processing corresponding to the operation on the input device based on the input from the input device 102.

The display 103 includes a plurality of LEDs, a display panel, and the like, and turns on/off the LEDs in a predetermined manner or displays information on the display panel under a control of the controller 100.

Under the control of the controller 100, the communicator 104 performs communication with an external apparatus such as a host computer according to a predetermined communication standard.

The camera module 7 includes the camera 72, the LED light source 73a, and the LED light source 73b.

The camera 72 includes an image sensor 722 and a camera controller 701, in addition to the lens 721. The image sensor 722 includes a light receiver (light receiving unit) 702 and an output device (output unit, output circuit or output board) 703. The light receiver 702 is configured with a plurality of light receiving elements, and receives light reflected from the print surface 3a of the print medium 3. The output device 703 outputs, for each pixel, an electrical signal corresponding to an intensity of the light received by the light receiver 702 to the camera controller 701. That is, the output device 703 of the image sensor 722 generates image data representing the captured image, and outputs the image data to the camera controller 701. In the following description, the image data which is output by the output device 703 of the image sensor 722 is referred to as captured image data.

The camera controller 701 includes a CPU (camera processor), a ROM (memory), a RAM, an ASIC, a signal processing circuit, and the like, and controls each component of the camera 72 under the control of the controller 100. The camera controller 701 generates image data to be output to the controller 100 based on the captured image data which is input from the output device 703 of the image sensor 722, and outputs the image data to the controller 100. In the following description, the image data which is output by the camera controller 701 is referred to as output image data. In the present embodiment, processing in which the camera controller 701 generates output image data and outputs the output image data to the controller 100 includes processing in which the camera controller 701 outputs the captured image data that is input from the output device 703 to the controller 100 as it is as output image data.

As described above, the camera 72 includes the image sensor 722 and the camera controller 701, captures the capturing range SA on the print surface 3a of the print medium 3, and outputs the output image data to the controller 100.

Under the control of the controller 100, electric power is supplied to the LED light source 73a and the LED light source 73b, and thus the LED light source 73a and the LED light source 73b irradiate the print surface 3a of the print medium 3 with light.

The printer 105 includes the ink jet head 8 that forms dots by ejecting an ink onto the print medium 3 loaded into the printing apparatus 1, the carriage 6 that moves the ink jet head 8 in the perpendicular direction TY1, a carriage drive motor that drives the carriage 6, a heater that dries the print medium 3 onto which the ink is adhered, and other configurations related to the printing on the print medium 3. The controller 100 performs a control such that the printer 105 forms dots by ejecting the ink onto the print medium 3 loaded into the printing apparatus 1. Thereby, characters, images, and the like are printed.

The transport mechanism 106 includes a transport roller for transporting the print medium 3 in the transport direction HY1, a transport motor for rotating the transport roller, a motor driver for driving the transport motor, and other configurations related to the transporting of the print medium 3. The transport mechanism 106 transports the print medium 3 under the control of the controller 100.

As illustrated in FIG. 4, the controller 100 includes the acquisition generator 201 and the parameter generator 202.

The acquisition generator 201 acquires the output image data from the camera controller 701, and generates image data for generating a parameter to be used for adjustment related to printing by the printing apparatus 1 based on the acquired output image data. Here, the parameter is referred to as a so-called correction value. In the following description, the image data for generating a parameter to be used for adjustment of the printing apparatus 1 is referred to as generation image data. In the present embodiment, processing in which the acquisition generator 201 generates the generation image data and outputs the generation image data to the parameter generator 202 includes processing in which the acquisition generator 201 outputs the output image data that is input from the camera controller 701 to the parameter generator 202 as it is as the generation image data.

Based on the generation image data which is input from the acquisition generator 201, the parameter generator 202 generates a parameter to be used for adjustment related to printing by the printing apparatus 1. As described above, in the present embodiment, the adjustment of the printing apparatus 1 is at least one of ejection timing adjustment, ejection amount adjustment, density unevenness adjustment, and transport amount adjustment. Therefore, based on the generation image data which is input from the acquisition generator 201, the parameter generator 202 generates at least one of a parameter to be used for ejection timing adjustment, a parameter to be used for ejection amount adjustment, a parameter to be used for density unevenness adjustment, and a parameter to be used for transport amount adjustment. In the present embodiment, the adjustment also includes the parameter generation.

Based on the parameters generated by the parameter generator 202, the controller 100 executes generation of print data, transport of the print medium 3, and the like, and executes each adjustment.

As described above, the printing apparatus 1 causes the camera 72 to capture an image of a detection chart KT printed on the print surface 3a of the print medium 3, generates captured image data, output image data, and generation image data in order based on the captured image obtained by capturing, and generates parameters to be used for adjustment of the printing apparatus 1. The detection chart KT is referred to as a generic term when describing one detection chart without distinguishing a detection chart KT1, a detection chart KT2, a detection chart KT21, a detection chart KT3, and a detection chart KT4 to be described in the following description. Here, for a period from capturing to generation of parameters, in the printing apparatus 1, the image data illustrated in FIG. 5 is transmitted.

Figure 5:
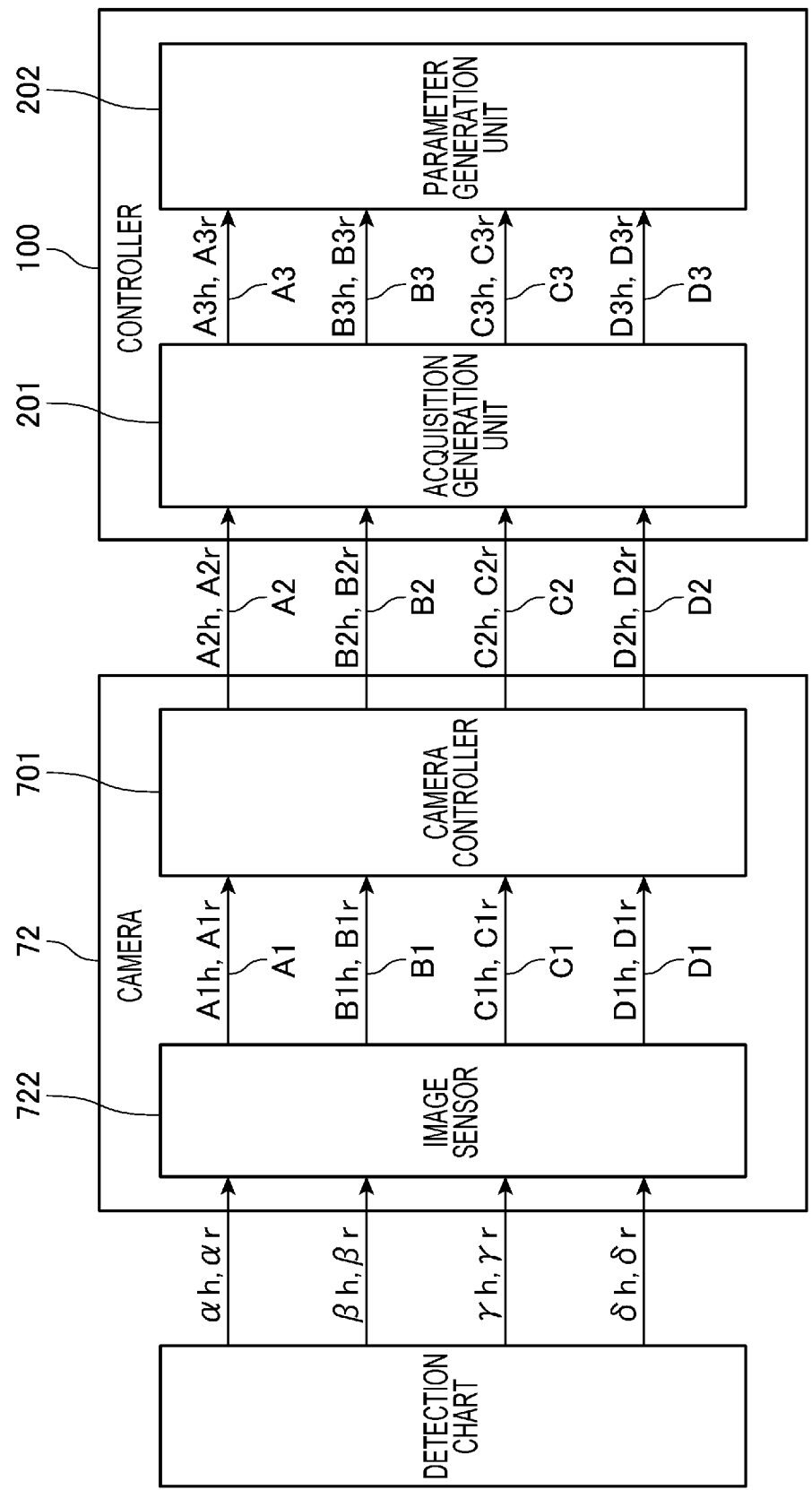
FIG. 5 is a diagram schematically illustrating transmission of image data.

FIG. 5 is a diagram schematically illustrating transmission of the image data.

In FIG. 5, "α (alpha) h" represents a capturing range SA when capturing an image of the printed detection chart KT1 (FIG. 7) in an execution of ejection timing adjustment. In addition, in FIG. 5, "αr" represents a capturing resolution which is a resolution when capturing an image of the printed detection chart KT1 in an execution of ejection timing adjustment. That is, FIG. 5 illustrates that the printed detection chart KT1 is captured in the capturing range SA of "αh" and with the capturing resolution of "αr" in an execution of ejection timing adjustment.

In addition, in FIG. 5, "A1" represents captured image data which is output from the image sensor 722 to the camera controller 701 in an execution of ejection timing adjustment. In addition, "A1h" represents an image range GA which is a range of an image represented by the captured image data A1. The image range GA is a range of an image, in other words, a range in which pixels of an image are disposed side by side. The image range GA is referred to as a generic term when describing one image range without distinguishing an image range GA1, an image range GA2, an image range GA3, and an image range GA4 to be described in the following description. In addition, "A1r" represents an image resolution which is a resolution of an image represented by the captured image data A1. That is, FIG. 5 illustrates that the image sensor 722 transmits the captured image data with the image range GA of "A1h" and the image resolution of "A1r" to the camera controller 701 in an execution of ejection timing adjustment.

In addition, in FIG. 5, "A2" represents output image data which is output from the camera controller 701 to the controller 100 in an execution of ejection timing adjustment. In addition, "A2h" represents an image range GA of the output image data A2. In addition, "A2r" represents an image resolution of the output image data A2. That is, FIG. 5 illustrates that the camera controller 701 transmits the output image data with the image range GA of "A2h" and the image resolution of "A2r" to the controller 100 in an execution of ejection timing adjustment.

In addition, in FIG. 5, "A3" represents generation image data which is output from the acquisition generator 201 of the controller 100 to the parameter generator 202 in an execution of ejection timing adjustment. In addition, "A3h" represents an image range GA of the generation image data A3. In addition, "A3r" represents an image resolution of the generation image data A3. That is, FIG. 5 illustrates that the acquisition generator 201 transmits the generation image data with the image range GA of "A3h" and the image resolution of "A3r" to the parameter generator 202 in an execution of ejection timing adjustment.

In this manner, the image data when executing the ejection timing adjustment is transmitted from the image sensor 722 to the camera controller 701, as the captured image data, is transmitted from the camera controller 701 to the controller 100, as the output image data, and then is transmitted from the acquisition generator 201 to the parameter generator 202, as the generation image data.

In FIG. 5, "β (beta) h" represents a capturing range SA when capturing an image of the printed detection chart KT21 (FIG. 8 or the like) in an execution of ejection amount adjustment. In addition, in FIG. 5, "βr" represents a capturing resolution when capturing an image of the printed detection chart KT21 in an execution of ejection amount adjustment. That is, FIG. 5 illustrates that the printed detection chart KT21 is captured in the capturing range SA of "βh" and with the capturing resolution of "βr" in an execution of ejection amount adjustment.

In addition, in FIG. 5, "B1" represents captured image data which is output from the image sensor 722 to the camera controller 701 in an execution of ejection amount adjustment. In addition, "B1$h$" represents an image range GA of the captured image data B1. In addition, "B1$r$" represents an image resolution of the captured image data B1. That is, FIG. 5 illustrates that the image sensor 722 transmits the captured image data with the image range GA of "B1$h$" and the image resolution of "B1$r$" to the camera controller 701 in an execution of ejection amount adjustment.

In addition, in FIG. 5, "B2" represents output image data which is output from the camera controller 701 to the controller 100 in an execution of ejection amount adjustment. In addition, "B2$h$" represents an image range GA of the output image data B2. In addition, "B2$r$" represents an image resolution of the output image data B2. That is, FIG. 5 illustrates that the camera controller 701 transmits the output image data with the image range GA of "B2$h$" and the image resolution of "B2$r$" to the controller 100 in an execution of ejection amount adjustment.

In addition, in FIG. 5, "B3" represents generation image data which is output from the acquisition generator 201 of the controller 100 to the parameter generator 202 in an execution of ejection amount adjustment. In addition, "B3$h$" represents an image range GA of the generation image data B3. In addition, "B3$r$" represents an image resolution of the generation image data B3. That is, FIG. 5 illustrates that the acquisition generator 201 transmits the generation image data with the image range GA of "B3$h$" and the image resolution of "B3$r$" to the parameter generator 202 in an execution of ejection amount adjustment.

As described above, the image data when executing the ejection amount adjustment is transmitted in the same manner as the transmission of the image data when executing the ejection timing adjustment.

In FIG. 5, "$\gamma$ (gamma) h" represents a capturing range SA when capturing an image of the printed detection chart KT3 (FIG. 10 or the like) in an execution of density unevenness adjustment. In addition, in FIG. 5, "$\gamma r$" represents a capturing resolution when capturing an image of the printed detection chart KT3 in an execution of density unevenness adjustment. That is, FIG. 5 illustrates that the printed detection chart KT3 is captured in the capturing range SA of "$\gamma h$" and with the capturing resolution of "$\gamma r$" in an execution of density unevenness adjustment.

In addition, in FIG. 5, "C1" represents captured image data which is output from the image sensor 722 to the camera controller 701 in an execution of density unevenness adjustment. In addition, "C1$h$" represents an image range GA of the captured image data C1. In addition, "C1$r$" represents an image resolution of the captured image data C1. That is, FIG. 5 illustrates that the image sensor 722 transmits the captured image data with the image range GA of "C1$h$" and the image resolution of "C1$r$" to the camera controller 701 in an execution of density unevenness adjustment.

In addition, in FIG. 5, "C2" represents output image data which is output from the camera controller 701 to the controller 100 in an execution of density unevenness adjustment. In addition, "C2$h$" represents an image range GA of the output image data C2. In addition, "C2$r$" represents an image resolution of the output image data C2. That is, FIG. 5 illustrates that the camera controller 701 transmits the output image data with the image range GA of "C2$h$" and the image resolution of "C2$r$" to the controller 100 in an execution of density unevenness adjustment.

In addition, in FIG. 5, "C3" represents generation image data which is output from the acquisition generator 201 of the controller 100 to the parameter generator 202 in an execution of density unevenness adjustment. In addition, "C3$h$" represents an image range GA of the generation image data C3. In addition, "C3$r$" represents an image resolution of the generation image data C3. That is, FIG. 5 illustrates that the acquisition generator 201 transmits the generation image data with the image range GA of "C3$h$" and the image resolution of "C3$r$" to the parameter generator 202 in an execution of density unevenness adjustment.

As described above, the image data when executing the density unevenness adjustment is transmitted in the same manner as the transmission of the image data when executing the ejection timing adjustment.

In FIG. 5, "$\delta$ (delta) h" represents a capturing range SA when capturing an image of the printed detection chart KT4 (FIG. 12 or the like) in an execution of transport amount adjustment. In addition, in FIG. 5, "$\delta r$" represents a capturing resolution when capturing an image of the printed detection chart KT4 in an execution of transport amount adjustment. That is, FIG. 5 illustrates that the printed detection chart KT4 is captured in the capturing range SA of "$\delta h$" and with the capturing resolution of "$\delta r$" in an execution of transport amount adjustment.

In addition, in FIG. 5, "D1" represents captured image data which is output from the image sensor 722 to the camera controller 701 in an execution of transport amount adjustment. In addition, "D1$h$" represents an image range GA of the captured image data D1. In addition, "D1$r$" represents an image resolution of the captured image data D1. That is, FIG. 5 illustrates that the image sensor 722 transmits the captured image data with the image range GA of "D1$h$" and the image resolution of "D1$r$" to the camera controller 701 in an execution of transport amount adjustment.

In addition, in FIG. 5, "D2" represents output image data which is output from the camera controller 701 to the controller 100 in an execution of transport amount adjustment. In addition, "D2$h$" represents an image range GA of the output image data D2. In addition, "D2$r$" represents an image resolution of the output image data D2. That is, FIG. 5 illustrates that the camera controller 701 transmits the output image data with the image range GA of "D2$h$" and the image resolution of "D2$r$" to the controller 100 in an execution of transport amount adjustment.

In addition, in FIG. 5, "D3" represents generation image data which is output from the acquisition generator 201 of the controller 100 to the parameter generator 202 in an execution of transport amount adjustment. In addition, "D3$h$" represents an image range GA of the generation image data D3. In addition, "D3$r$" represents an image resolution of the generation image data D3. That is, FIG. 5 illustrates that the acquisition generator 201 transmits the generation image data with the image range GA of "D3$h$" and the image resolution of "D3$r$" to the parameter generator 202 in an execution of transport amount adjustment.

As described above, the image data when executing the transport amount adjustment is transmitted in the same manner as the transmission of the image data when executing the ejection timing adjustment.

On the other hand, for example, in a case where the image sensor 722 includes the light receiving elements disposed side by side in 1600 rows and 1200 columns, the image data representing the captured image which is captured by the camera 72 is image data with a data amount of approximately two million pixels at a maximum capturing resolution. Therefore, as the number of the light receiving elements of the image sensor 722 increases, the data amount of the image data representing the captured image which is captured at the maximum capturing resolution increases.

Generally, transmission of the image data is restricted by a transmission rate representing an amount of data that can be transmitted per unit time. For this reason, as the data amount of the image data increases, it takes more time to transmit the image data. As a result, in the printing apparatus 1, it takes more time to generate the parameters to be used for adjustment of the printing apparatus 1. Thus, in the printing apparatus 1, it takes more time to perform adjustment using the generated parameters.

Therefore, the printing apparatus 1 according to the present embodiment performs the following operation.

Hereinafter, an operation of the printing apparatus 1 according to the present embodiment will be described for each adjustment item of the printing apparatus 1.
Ejection Timing Adjustment First, an operation of the printing apparatus 1 in ejection timing adjustment will be described.

Figure 6:
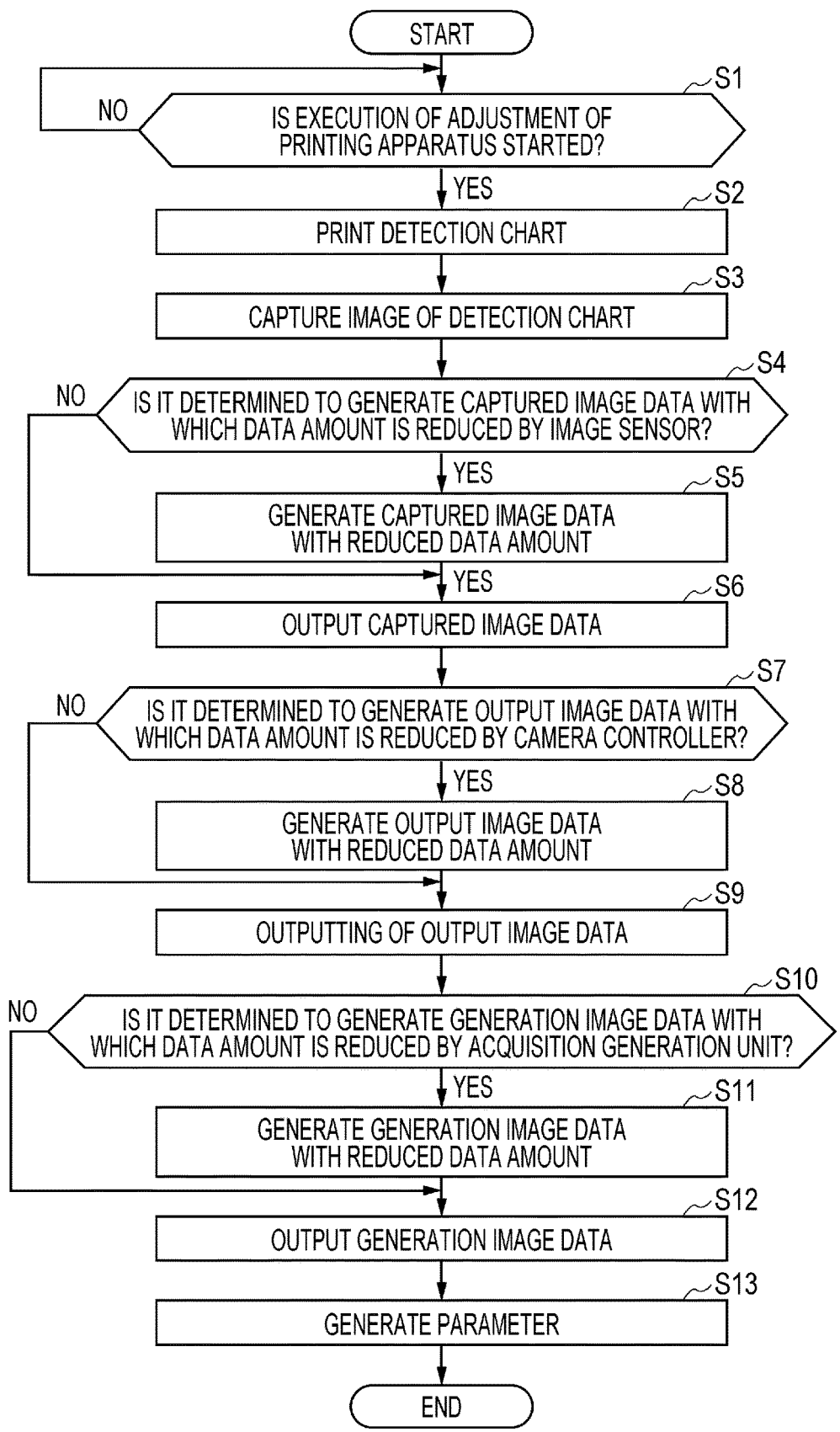
FIG. 6 is a flowchart illustrating an operation of the printing apparatus.

FIG. 6 is a flowchart illustrating an operation of the printing apparatus 1.

The controller 100 of the printing apparatus 1 determines whether or not to start an execution of adjustment of the printing apparatus 1 (step S1). Here, ejection timing adjustment is described as an example of adjustment of the printing apparatus 1. Thus, the controller 100 determines whether or not to start an execution of ejection timing adjustment (step S1). For example, in a case where the input device 102 detects an operation instructing an execution of ejection timing adjustment, the controller 100 determines to start an execution of ejection timing adjustment based on the input from the input device 102 (YES in step S1). In addition, for example, in a case where a predetermined time period elapses after the previous execution of ejection timing adjustment, the controller 100 determines to start an execution of ejection timing adjustment in response to the elapse of the predetermined time period (YES in step S1). In addition, for example, in a case where power is initially supplied to the printing apparatus 1, the controller 100 determines to start an execution of ejection timing adjustment in response to the power supply (YES in step S1).

Next, when determining to start an execution of ejection timing adjustment (YES in step S1), the controller 100 acquires detection chart data 301 for the ejection timing adjustment from the detection chart database 300 stored in the storage 101, and controls the printer 105 and the transport mechanism 106 such that a detection chart KT1 (FIG. 7) for the ejection timing adjustment is printed on the print surface 3a of the print medium 3 (step S2).

Next, the controller 100 causes the camera 72 to capture an image of the detection chart KT1 (FIG. 7) for the ejection timing adjustment, the detection chart being printed on the print medium 3 (step S3).

Figure 7:
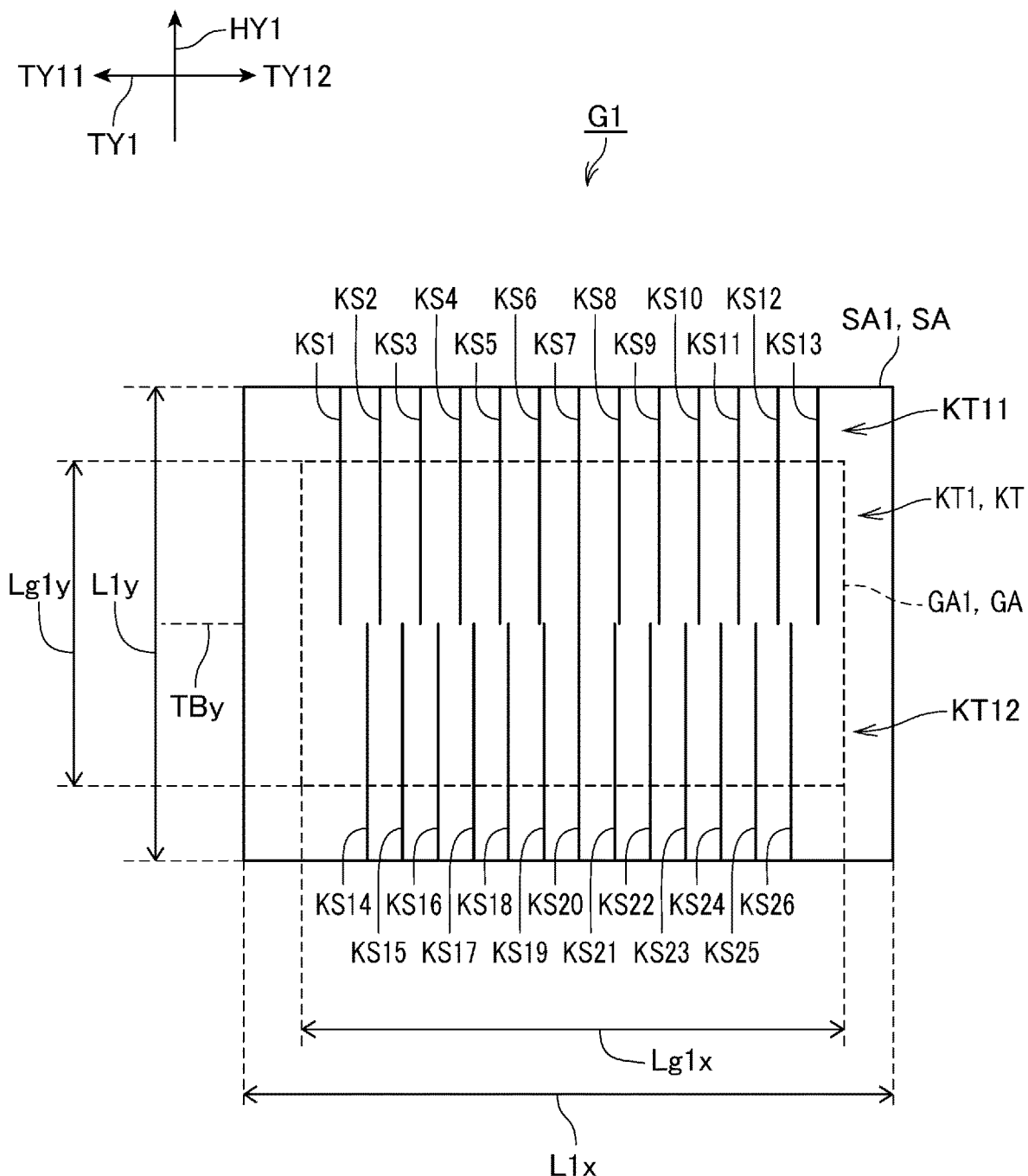
FIG. 7 is a diagram illustrating an example of a captured image of a detection chart for ejection timing adjustment.

FIG. 7 is a diagram illustrating an example of a captured image G1 obtained by capturing the image of the detection chart KT1 for the ejection timing adjustment.

The captured image G1 illustrated in FIG. 7 is a captured image having a region corresponding to the capturing range SA1 of the camera 72. As illustrated in FIG. 7, the captured image G1 is a rectangular-shaped captured image, a length of the captured image G1 in the perpendicular direction TY1 (a direction corresponding to a movement direction of the carriage 6) has a dimension L1x, and a length of the captured image G1 in the transport direction HY1 (a direction corresponding to the transport direction by the transport mechanism 106) has a dimension L1y. As illustrated in FIG. 7, the detection chart KT1 for the ejection timing adjustment that is represented by the captured image G1 includes a first detection chart KT11 on the downstream side of the center portion TBy in the transport direction HY1, and a second detection chart KT12 on the upstream side of the center portion TBy in the transport direction HY1. The first detection chart KT11 is a pattern image in which a ruled line KS1 to a ruled line KS13 are disposed side by side at predetermined intervals in the perpendicular direction TY1. The second detection chart KT12 is a pattern image in which a ruled line KS14 to a ruled line KS26 are disposed side by side in the perpendicular direction TY1 by being shifted by a predetermined amount from the ruled line KS1 to the ruled line KS13 of the first detection chart KT11.

The capturing range SA1 of the captured image G1 corresponds to "αh" illustrated in FIG. 5.

Returning to the explanation of the flowchart illustrated in FIG. 6, when the image of the detection chart KT1 for the ejection timing adjustment is captured, the detection chart being printed on the print medium 3, the controller 100 determines whether to control the image sensor 722 so as to generate captured image data with which a data amount is reduced by the image sensor 722 (step S4). As illustrated in FIG. 5, for a period from the capturing to parameter generation, in the printing apparatus 1, transmission of the image data is performed at three portions including a portion between the image sensor 722 and the camera controller 701, a portion between the camera controller 701 and the controller 100, and a portion between the acquisition generator 201 and the parameter generator 202. Therefore, in a case where it is determined that a portion with which a data amount can be reduced in transmission of the image data is the portion between the image sensor 722 and the camera controller 701 by a pre-test, a simulation, or the like, the controller 100 determines to generate captured image data with a reduced data amount by the image sensor 722 (YES in step S4).

When the controller 100 determines to generate captured image data with a reduced data amount by the image sensor 722 (YES in step S4), the image sensor 722 generates captured image data with a reduced data amount according to a control from the controller 100 that is input via the camera controller 701 (step S5).

Here, step S5 will be described in detail with reference to FIG. 7.

When reducing the data amount of the captured image data, the image sensor 722 makes the image range GA of the captured image data smaller than the capturing range SA1. In a case of FIG. 7, the image sensor 722 sets a rectangular region of which a length in the perpendicular direction TY1 has a dimension Lg1x and a length in the transport direction HY1 has a dimension Lg1y, as the image range GA1 of the captured image data. That is, the image sensor 722 cuts out the image data of the image range GA1 from the image data of the capturing range SA1, as the captured image data. As illustrated in FIG. 7, the image range GA1 is smaller than the capturing range SA1, and thus the image sensor 722 can reduce the data amount of the captured image data. More specifically, the image sensor 722 generates the captured image data of the image range GA1, and thus the data amount corresponding to "capturing range SA1-image range GA1" can be reduced as compared with the data amount of the image data of the capturing range SA1.

In a case of the image data obtained by capturing an image of the detection chart KT1 for the ejection timing adjustment, the image range GA1 is not limited to a range smaller than the capturing range SA1. When generating a parameter in the ejection timing adjustment, the parameter generator 202 generates a parameter based on the first detection chart KT11 and the second detection chart KT12. Therefore, it is required that the image range GA1 is a range including at least the ruled line KS1 to the ruled line KS13 of the first detection chart KT11 and including at least the ruled line KS14 to the ruled line KS26 of the second detection chart KT12.

Returning to the explanation of the flowchart illustrated in FIG. 6, when generating the captured image data with the reduced data amount, the image sensor 722 outputs the captured image data to the camera controller 701 according to a control from the controller 100 that is input via the camera controller 701 (step S6). That is, in a case of FIG. 5, the image sensor 722 outputs the captured image data satisfying "αh">"A1$h$" to the camera controller 701.

Returning to the explanation of step S4 in the flowchart of FIG. 6, when the controller 100 determines not to generate captured image data with a reduced data amount by the image sensor 722 (NO in step S4), the image sensor 722 outputs the image data of the capturing range SA1 to the camera controller 701, as captured image data, according to a control from the controller 100 that is input via the camera controller 701 (step S6). That is, in the case of FIG. 5, the image sensor 722 outputs the captured image data satisfying "αh"="A1$h$" to the camera controller 701.

Next, when the image sensor 722 outputs the captured image data, the controller 100 determines whether to generate output image data with a reduced data amount by the camera controller 701 (step S7). In a case where it is determined that a portion with which a data amount can be reduced in transmission of the image data is the portion between the camera controller 701 and the controller 100 by a pre-test, a simulation, or the like, the controller 100 determines to generate output image data with a reduced data amount by the camera controller 701 (YES in step S7). In addition, in step S5, in a case where the image sensor 722 generates the captured image data with the reduced data amount, the controller 100 determines not to generate output image data with a reduced data amount by the camera controller 701 (NO in step S7).

When the controller 100 determines to generate output image data with a reduced data amount by the camera controller 701 (YES in step S7), the camera controller 701 reduces the data amount of the output image data according to a control from the controller 100 (step S8). In step S8, the camera controller 701 generates the output image data with a reduced data amount, in the same manner as the generation of the captured image data with the reduced data amount by the image sensor 722. That is, the image range GA1 is smaller than the capturing range SA1, and thus the camera controller 701 can reduce the data amount of the output image data.

Returning to the explanation of the flowchart illustrated in FIG. 6, when generating the output image data with the reduced data amount, the camera controller 701 outputs the output image data to the controller 100 according to a control from the controller 100 (step S9). That is, in the case of FIG. 5, the camera controller 701 outputs the output image data satisfying "αh">"A2$h$" to the controller 100.

In addition, returning to the explanation of step S7 in the flowchart of FIG. 6, when the controller 100 determines not to reduce the data amount of the output image data (NO in step S7), the camera controller 701 outputs the image data of the capturing range SA1 to the controller 100, as the output image data, according to a control from the controller 100 (step S9). That is, in the case of FIG. 5, the camera controller 701 outputs the output image data satisfying "αh"="A2$h$" to the controller 100. In addition, in step SA5, in a case where the captured image data with the reduced data amount is generated by the image sensor 722, the camera controller 701 outputs the captured image data with the reduced data amount to the controller 100, as the output image data. That is, in the case of FIG. 5, the camera controller 701 outputs the output image data satisfying "αh">"A2$h$" to the controller 100.

Next, when the camera controller 701 outputs the output image data, the acquisition generator 201 determines whether to generate generation image data with a reduced data amount (step S10). In a case where it is determined that a portion with which a data amount can be reduced in transmission of the image data is the portion between the acquisition generator 201 and the parameter generator 202 by a pre-test, a simulation, or the like, the acquisition generator 201 determines to generate generation image data with a reduced data amount (YES in step S10). In addition, in a case where the image sensor 722 generates the captured image data with the reduced data amount in step S5, or in a case where the camera controller 701 generates the output image data with the reduced data amount in step S8, the acquisition generator 201 determines not to generate generation image data with a reduced data amount (NO in step S10).

When the acquisition generator 201 determines to generate generation image data with a reduced data amount (YES in step S10), the acquisition generator 201 generates generation image data with a reduced data amount (step S11). In step S11, the acquisition generator 201 generates the generation image data with a reduced data amount, in the same manner as the generation of the captured image data with the reduced data amount by the image sensor 722. That is, the image range GA1 is smaller than the capturing range SA1, and thus the acquisition generator 201 can reduce the data amount of the generation image data.

Returning to the explanation of the flowchart of FIG. 6, when generating the generation image data with the reduced data amount, the acquisition generator 201 outputs the generation image data to the parameter generator 202 (step S12). That is, in the case of FIG. 5, the acquisition generator 201 outputs the generation image data satisfying "αh">"A3$h$" to the parameter generator 202.

In addition, returning to the explanation of step S10 in the flowchart of FIG. 6, when the acquisition generator 201 determines not to reduce the data amount of the generation image data (NO in step S10), the acquisition generator 201 outputs the image data of the image range GA1 to the parameter generator 202, as the generation image data (step S12). When performing step S12, since the data amount is reduced by one of the image sensor 722, the camera controller 701, and the acquisition generator 201, the acquisition generator 201 outputs the image data of the image range GA1 to the parameter generator 202, as the generation image data. That is, in the case of FIG. 5, the acquisition generator 201 outputs the generation image data satisfying "αh">"A3$h$" to the parameter generator 202.

Next, when the generation image data with the reduced data amount is input from the acquisition generator 201, the parameter generator 202 generates a parameter to be used for the ejection timing adjustment based on the generation image data (step S13). The controller 100 generates a parameter to be used for the ejection timing adjustment by an existing method. For example, the parameter generator 202 calculates positions of the ruled line KS1 to the ruled line KS13 of the first detection chart KT11, and calculates positions of the ruled line KS14 to the ruled line KS26 of the second detection chart KT12. The parameter generator 202 generates a parameter for correcting an ink ejection timing such that the ruled line KS1 to the ruled line KS13 of the first detection chart KT11 and the ruled line KS14 to the ruled line KS26 of the second detection chart KT12 are appropriately shifted from each other.

In this manner, the controller 100 can reduce the data amount of one of the captured image data which is output from the image sensor 722, the output image data which is output from the camera controller 701, and the generation image data which is output from the acquisition generator 201. Thus, for a period from the capturing of the image of the detection chart KT1 for the ejection timing adjustment to the generation of the parameter, transmission of the image data with the reduced data amount is performed. Therefore, the printing apparatus 1 can shorten a time required to generate the parameter to be used for the ejection timing adjustment. In addition, the printing apparatus 1 can shorten the time required to generate the parameter to be used for the ejection timing adjustment, and thus can shorten a time required for the ejection timing adjustment using the parameter.

As described above, in a case where the ejection timing adjustment is performed as adjustment of the printing apparatus 1, the controller 100 reduces the data amount of the image data by making the image range GA1 smaller than the capturing range SA1. On the other hand, a method of reducing the data amount is not limited to a method of making the image range GA1 of the image data smaller than the capturing range SA1. For example, the data amount of the image data may be reduced by making the image resolution of the image data lower than the capturing resolution. That is, the image sensor 722 may generate the captured image data satisfying $\alpha r > A1r$. In addition, the camera controller 701 may generate the output image data satisfying $\alpha r > A2r$. In addition, the acquisition generator 201 may generate the generation image data satisfying $\alpha r > A3r$. Since the parameter is generated based on the shifted positions of the ruled lines in the ejection timing adjustment, it is preferable to set the image resolution of the image data to be equal to or higher than the printing resolution such that the positions of the ruled lines can be clearly specified.

Ejection Amount Adjustment

Next, an operation of the printing apparatus 1 in ejection amount adjustment will be described with reference to FIG. 6.

In an explanation of the operation of the printing apparatus 1 in the ejection amount adjustment, it is assumed that colors of the ink ejected from the ink jet head 8 are four colors of cyan (C), magenta (M), yellow (Y), and black (K).

The controller 100 of the printing apparatus 1 determines whether to start an execution of an adjustment item (adjustment) related to printing of the printing apparatus 1 (step S1). Here, ejection amount adjustment is described as an example of adjustment of the printing apparatus 1. Thus, the controller 100 determines whether or not to start an execution of ejection amount adjustment (step S1). For example, in a case where the input device 102 detects an operation instructing an execution of ejection amount adjustment, the controller 100 determines to start an execution of ejection amount adjustment based on the input from the input device 102 (YES in step S1). In addition, for example, in a case where a predetermined time period elapses after the previous execution of ejection amount adjustment, the controller 100 determines to start an execution of ejection amount adjustment in response to the elapse of the predetermined time period (YES in step S1). In addition, for example, in a case where power is initially supplied to the printing apparatus 1, the controller 100 determines to start an execution of ejection amount adjustment in response to the power supply (YES in step S1).

Next, when determining to start an execution of ejection amount adjustment (YES in step S1), the controller 100 acquires detection chart data 301 for the ejection amount adjustment from the detection chart database 300 stored in the storage 101, and controls the printer 105 and the transport mechanism 106 such that a detection chart KT2 for the ejection amount adjustment is printed on the print surface 3a of the print medium 3 (step S2).

Figure 8:
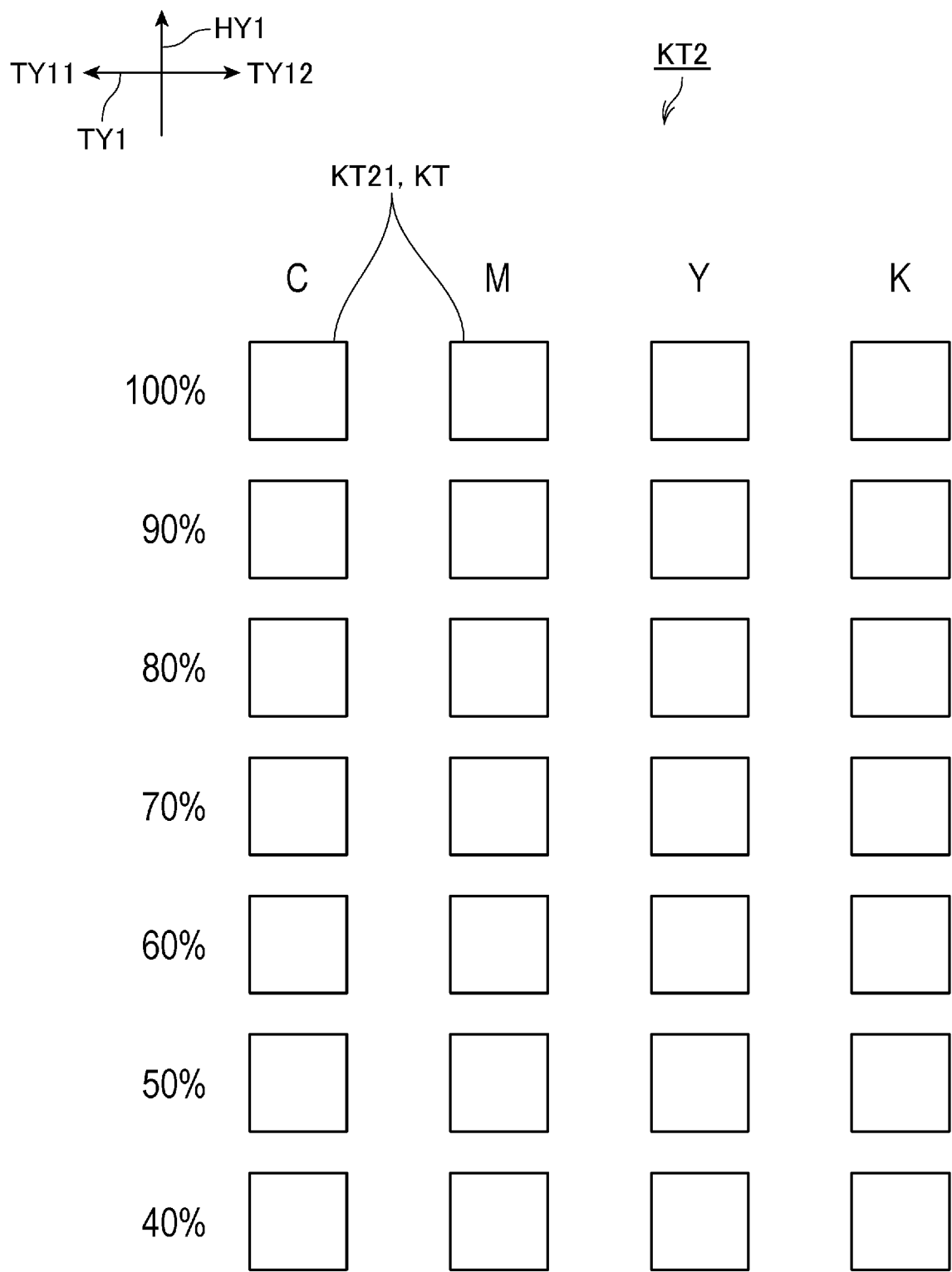
FIG. 8 is a diagram illustrating an example of a detection chart for ejection amount adjustment.

FIG. 8 is a diagram illustrating an example of the detection chart KT2 for the ejection amount adjustment.

As illustrated in FIG. 8, the detection chart KT2 for the ejection amount adjustment is a pattern image including a plurality of detection charts KT21.

As illustrated in FIG. 8, the detection chart KT2 for the ejection amount adjustment includes the detection charts KT21 which are disposed side by side corresponding to colors of cyan (C), magenta (M), yellow (Y), and black (K) in order from the direction TY11 of the perpendicular direction TY1. In addition, the detection chart KT2 for the ejection amount adjustment includes seven detection charts KT21 along the transport direction HY1 that correspond to each color of cyan (C), magenta (M), yellow (Y), and black (K) and have different densities from a density of 100% to a density of 40% at intervals of 10% density. Here, a density represents a percentage of the ink with respect to a predetermined unit area. For example, when a density of cyan (C) is 100%, it means that dots of cyan (C) are formed at 100% with respect to a predetermined unit area.

In the explanation of the operation of the printing apparatus 1 in the ejection amount adjustment, it is assumed that colors of the ink ejected from the ink jet head 8 are four colors of cyan (C), magenta (M), yellow (Y), and black (K). Thus, the detection chart KT2 for the ejection amount adjustment includes the detection charts KT21 corresponding to the colors of cyan (C), magenta (M), yellow (Y), and black (K). Therefore, in a case where the colors of the ink ejected from the ink jet head 8 are ten colors, the detection chart KT2 for the ejection amount adjustment includes the detection charts KT21 corresponding to the ten colors.

Returning to the explanation of the flowchart illustrated in FIG. 6, when the detection chart KT2 for the ejection amount adjustment is printed, the controller 100 causes the camera 72 to capture an image of one detection chart KT21 among the detection charts KT21 of the detection chart KT2 for the ejection amount adjustment, the detection charts being printed on the print medium 3 (step S3).

Figure 9:
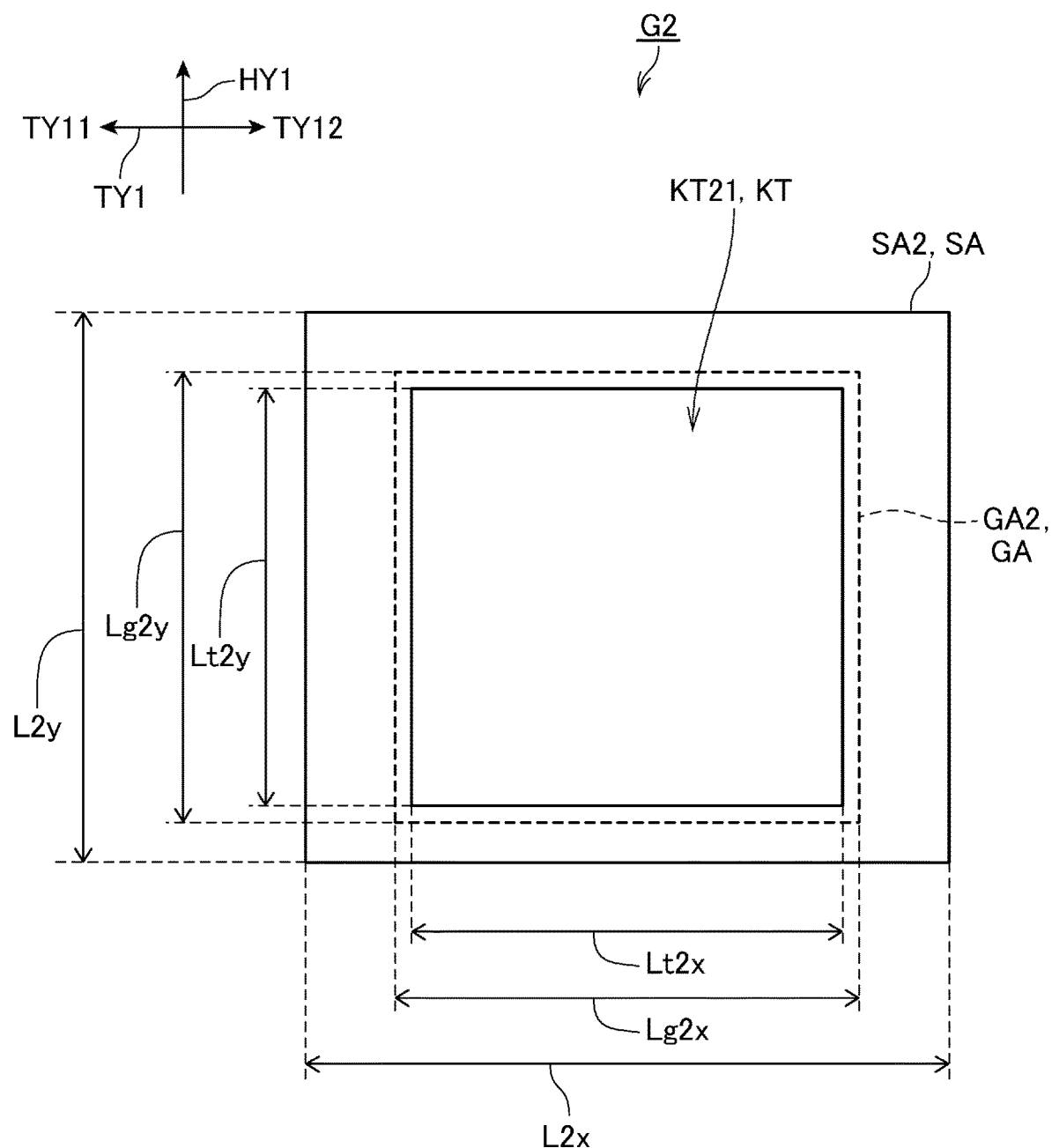
FIG. 9 is a diagram illustrating an example of a captured image of a detection chart for ejection amount adjustment.

FIG. 9 is a diagram illustrating an example of a captured image G2 obtained by capturing the image of the detection chart KT21 for the ejection amount adjustment.

The captured image G2 illustrated in FIG. 9 is a captured image having a region corresponding to the capturing range SA2 of the camera 72. As illustrated in FIG. 9, the captured image G2 is a rectangular-shaped captured image, a length of the captured image G2 in the perpendicular direction TY1 (a direction corresponding to a movement direction of the carriage 6) has a dimension L2x, and a length of the captured image G2 in the transport direction HY1 (a direction corresponding to the transport direction by the transport mechanism 106) has a dimension L2y. As illustrated in FIG. 9, the detection chart KT21 for the ejection amount adjustment that is represented by the captured image G2 is a rectangular-shaped pattern image, a length of the detection chart KT21 in the perpendicular direction TY1 has a dimension Lt2x, and a length of the detection chart KT21 in the transport direction HY1 has a dimension Lt2y. In FIG. 9, the detection chart KT21 having a density of 100% of cyan (C) is illustrated as an example.

The capturing range SA2 of the captured image G2 corresponds to "βh" illustrated in FIG. 5. Thus, in the ejection timing adjustment, the capturing range SA2 of the captured image G2 is not necessarily the same as the capturing range SA1 of the captured image G1. For example, in a case where a size of the detection chart KT21 for the ejection amount adjustment is smaller than a size of the detection chart KT1 for the ejection timing adjustment, when the capturing range SA2 in the ejection amount adjustment is matched with the capturing range SA1 in the ejection timing adjustment, the camera 72 unnecessarily acquires the captured image G2 having a wide capturing range SA2. That is, the data amount of the image data unnecessarily increases. Therefore, preferably, each of the capturing range SA1 in the ejection timing adjustment and the capturing range SA2 in the ejection amount adjustment is set to an appropriate capturing range SA according to the adjustment item, more specifically, according to the size of the detection chart KT. That is, in the case of FIG. 5, preferably, each capturing range SA satisfies "αh"≠"βh".

Returning to the explanation of the flowchart illustrated in FIG. 6, when the image of the detection chart KT21 for the ejection amount adjustment is captured, the detection chart being printed on the print medium 3, the controller 100 determines whether to control the image sensor 722 so as to generate captured image data with which a data amount is reduced by the image sensor 722 (step S4).

When the controller 100 determines to generate captured image data with a reduced data amount by the image sensor 722 (YES in step S4), the image sensor 722 generates captured image data with a reduced data amount according to a control from the controller 100 that is input via the camera controller 701 (step S5).

Here, step S5 will be described in detail with reference to FIG. 9.

When reducing the data amount of the captured image data, the image sensor 722 makes the image range GA of the captured image data smaller than the capturing range SA2. In a case of FIG. 9, the image sensor 722 sets a rectangular region of which a length in the perpendicular direction TY1 has a dimension Lg2x and a length in the transport direction HY1 has a dimension Lg2y, as the image range GA2 of the captured image data. That is, the image sensor 722 cuts out the image data of the image range GA2 from the image data of the capturing range SA2, as the captured image data. As illustrated in FIG. 9, the image range GA2 is smaller than the capturing range SA2, and thus the image sensor 722 can reduce the data amount of the captured image data. More specifically, the image sensor 722 generates the captured image data of the image range GA2, and thus the data amount corresponding to "capturing range SA2-image range GA2" can be reduced as compared with the data amount of the image data of the capturing range SA2. A length of the image range GA2 in the perpendicular direction TY1 may have a dimension Lt2x, and a length of the image range GA2 in the transport direction HY1 may have a dimension Lt2y. That is, the image range GA2 may be a range corresponding to a region of the detection chart KT21.

Returning to the explanation of the flowchart illustrated in FIG. 6, when generating the captured image data with the reduced data amount, the image sensor 722 outputs the captured image data to the camera controller 701 according to a control from the controller 100 that is input via the camera controller 701 (step S6). That is, in a case of FIG. 5, the image sensor 722 outputs the captured image data satisfying "βh">"B1h" to the camera controller 701.

Returning to the explanation of step S4 in the flowchart of FIG. 6, when the controller 100 determines not to generate captured image data with a reduced data amount by the image sensor 722 (NO in step S4), the image sensor 722 outputs the image data of the capturing range SA2 to the camera controller 701, as captured image data, according to a control from the controller 100 that is input via the camera controller 701 (step S6). That is, in a case of FIG. 5, the image sensor 722 outputs the captured image data satisfying "βh"="B1h" to the camera controller 701.

Next, when the image sensor 722 outputs the captured image data, the controller 100 determines whether to generate output image data with a reduced data amount by the camera controller 701 (step S7).

When the controller 100 determines to generate output image data with a reduced data amount by the camera controller 701 (YES in step S7), the camera controller 701 reduces the data amount of the output image data according to a control from the controller 100 (step S8). In step S8, the camera controller 701 generates the output image data with a reduced data amount, in the same manner as the generation of the captured image data with the reduced data amount by the image sensor 722. That is, the image range GA2 is smaller than the capturing range SA2, and thus the camera controller 701 can reduce the data amount of the output image data.

Returning to the explanation of the flowchart illustrated in FIG. 6, when generating the output image data with the reduced data amount, the camera controller 701 outputs the output image data to the controller 100 according to a control from the controller 100 (step S9). That is, in the case of FIG. 5, the camera controller 701 outputs the output image data satisfying "βh">"B2h" to the controller 100.

In addition, returning to the explanation of step S7 in the flowchart of FIG. 6, when the controller 100 determines not to reduce the data amount of the output image data (NO in step S7), the camera controller 701 outputs the image data of the capturing range SA2 to the controller 100, as the output image data, according to a control from the controller 100 (step S9). That is, in the case of FIG. 5, the camera controller 701 outputs the output image data satisfying "βh"="B2h" to the controller 100. In addition, in step SA5, in a case where the captured image data with the reduced data amount is generated by the image sensor 722, the camera controller 701 outputs the captured image data with the reduced data amount to the controller 100, as the output image data. That is, in the case of FIG. 5, the camera controller 701 outputs the output image data satisfying "βh">"B2h" to the controller 100.

Next, when the camera controller 701 outputs the output image data, the acquisition generator 201 determines whether to generate generation image data with a reduced data amount (step S10).

When the acquisition generator 201 determines to generate generation image data with a reduced data amount (YES in step S10), the acquisition generator 201 generates generation image data with a reduced data amount (step S11). In step S11, the acquisition generator 201 generates the generation image data with a reduced data amount, in the same manner as the generation of the captured image data with the reduced data amount by the image sensor 722. That is, the image range GA2 is smaller than the capturing range SA2, and thus the acquisition generator 201 can reduce the data amount of the generation image data.

Returning to the explanation of the flowchart of FIG. 6, when generating the generation image data with the reduced data amount, the acquisition generator 201 outputs the generation image data to the parameter generator 202 (step S12). That is, in the case of FIG. 5, the acquisition generator 201 outputs the generation image data satisfying "βh">"B3h" to the parameter generator 202.

In addition, returning to the explanation of step S10 in the flowchart of FIG. 6, when the acquisition generator 201 determines not to reduce the data amount of the generation image data (NO in step S10), the acquisition generator 201 outputs the image data of the image range GA2 to the parameter generator 202, as the generation image data (step S12). When performing step S12, since the data amount is reduced by one of the image sensor 722, the camera controller 701, and the acquisition generator 201, the acquisition generator 201 outputs the image data of the image range GA2 to the parameter generator 202, as the generation image data. That is, in the case of FIG. 5, the acquisition generator 201 outputs the generation image data satisfying "βh">"B3h" to the parameter generator 202.

Next, when the generation image data with the reduced data amount is input from the acquisition generator 201, the parameter generator 202 generates a parameter to be used for the ejection amount adjustment based on the generation image data (step S13). The parameter generator 202 generates a parameter to be used for the ejection amount adjustment by an existing method. For example, the parameter generator 202 calculates an average gradation value based on the generation image data by averaging gradation values of the detection chart KT21. The parameter generator 202 calculates a parameter such that the gradation value corresponding to a density of 100% becomes a value approximate to the calculated average gradation value. The parameter is, for example, a correction value for correcting a voltage to be applied to the nozzles of the ink jet head 8.

In this manner, the controller 100 can reduce the data amount of one of the captured image data which is output from the image sensor 722, the output image data which is output from the camera controller 701, and the generation image data which is output from the acquisition generator 201. Thus, for a period from the capturing of the image of the detection chart for the ejection amount adjustment to the generation of the parameter, transmission of the image data with the reduced data amount is performed. Therefore, the printing apparatus 1 can shorten a time required to generate the parameter to be used for the ejection amount adjustment. In addition, the printing apparatus 1 can shorten the time required to generate the parameter to be used for the ejection amount adjustment, and thus can shorten a time required for the ejection amount adjustment using the parameter.

As described above, in a case where the ejection amount adjustment is performed as adjustment of the printing apparatus 1, the controller 100 reduces the data amount of the image data by making the image range GA2 smaller than the capturing range SA2. On the other hand, a method of reducing the data amount is not limited to a method of making the image range GA2 of the image data smaller than the capturing range SA2. For example, the data amount of the image data may be reduced by making the image resolution of the image data lower than the capturing resolution. That is, the image sensor 722 may generate the captured image data satisfying βr>B1r. In addition, the camera controller 701 may generate the output image data satisfying βr>B2r. In addition, the acquisition generator 201 may generate the generation image data satisfying βr>B3r.

Density Unevenness Adjustment

Next, an operation of the printing apparatus 1 in density unevenness adjustment will be described with reference to FIG. 6.

The controller 100 of the printing apparatus 1 determines whether or not to start an execution of adjustment of the printing apparatus 1 (step S1). Here, density unevenness adjustment is described as an example of adjustment of the printing apparatus 1. Thus, the controller 100 determines whether or not to start an execution of density unevenness adjustment (step S1). For example, in a case where the input device 102 detects an operation instructing an execution of density unevenness adjustment, the controller 100 determines to start an execution of density unevenness adjustment based on the input from the input device 102 (YES in step S1). In addition, for example, in a case where a predetermined time period elapses after the previous execution of density unevenness adjustment, the controller 100 determines to start an execution of density unevenness adjustment in response to the elapse of the predetermined time period (YES in step S1). In addition, for example, in a case where power is initially supplied to the printing apparatus 1, the controller 100 determines to start an execution of density unevenness adjustment in response to the power supply (YES in step S1).

Next, when determining to start an execution of density unevenness adjustment (YES in step S1), the controller 100 acquires detection chart data 301 for the density unevenness adjustment from the detection chart database 300 stored in the storage 101, and controls the printer 105 and the transport mechanism 106 such that a detection chart KT3 for the density unevenness adjustment is printed on the print surface 3a of the print medium 3 (step S2).

Figure 10:
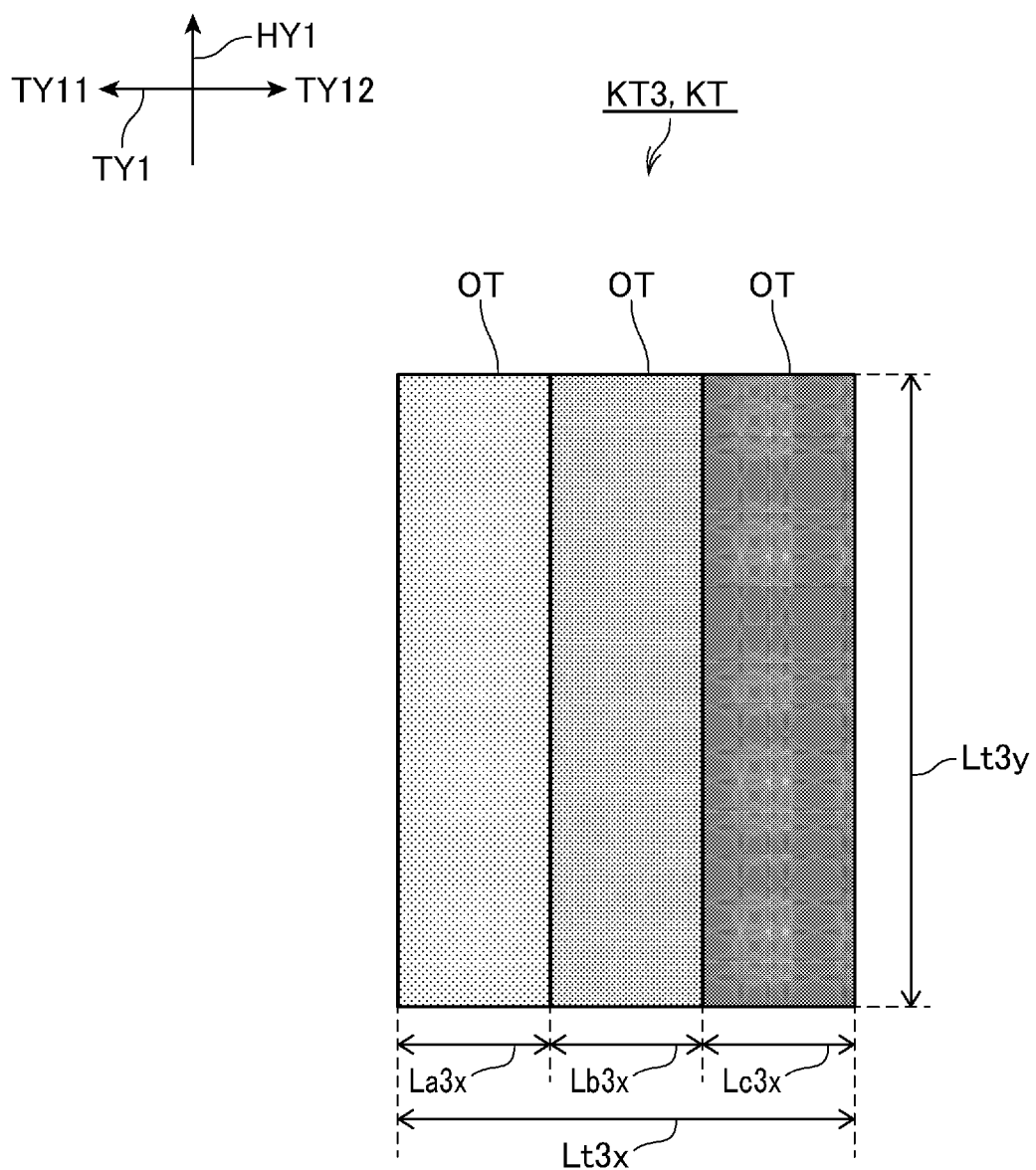
FIG. 10 is a diagram illustrating an example of a detection chart for density unevenness adjustment.

FIG. 10 is a diagram illustrating an example of the detection chart KT3 for the density unevenness adjustment.

As illustrated in FIG. 10, the detection chart KT3 for the density unevenness adjustment is a pattern image including a plurality of band-shaped detection charts OT that are elongated in the transport direction HY1.

As illustrated in FIG. 10, the detection chart KT3 for the density unevenness adjustment is printed such that densities in one band-shaped detection chart OT are the same density and the adjacent band-shaped detection charts OT have different densities from each other. In the present embodiment, the detection chart KT3 for the density unevenness adjustment includes three band-shaped detection charts OT of a band-shaped detection chart OT having a density of 50%, a band-shaped detection chart OT having a density of 60%, and a band-shaped detection chart OT having a density of 70% in order from the direction TY11 (that is, the full side) along the perpendicular direction TY1.

The detection chart KT3 for the density unevenness adjustment is formed corresponding to the ink of each color. For example, in a case where ten nozzle lines 82 are provided in the ink jet head 8 corresponding to ten colors, the controller 100 causes the printer 105 to print ten detection charts KT3 on the print medium 3. In FIG. 10, although an example in which three band-shaped detection charts OT are provided in one detection chart KT3 is illustrated, more or fewer band-shaped detection charts OT having different densities may be provided. In addition, in a case where the band-shaped detection charts OT do not fit into one detection chart KT3, a plurality of detection charts KT3 may be provided. For example, a detection chart KT3 which includes three band-shaped detection charts OT having densities of 20%, 30%, and 40% and a detection chart KT3 which includes three band-shaped detection charts OT having densities of 50%, 60%, and 70% may be respectively provided.

A length of the detection chart KT3 illustrated in FIG. 10 in the perpendicular direction TY1 has a dimension Lt3x.

The dimension Lt3x is determined by a dimension La3x representing a length of the band-shaped detection chart OT having a density of 50% in the perpendicular direction TY1, a dimension Lb3x representing a length of the band-shaped detection chart OT having a density of 60% in the perpendicular direction TY1, and a dimension Lc3x representing a length of the band-shaped detection chart OT having a density of 70% in the perpendicular direction TY1. In addition, a length of the detection chart KT3 illustrated in FIG. 10 in the transport direction HY1 has a dimension Lt3y.

Returning to the explanation of the flowchart illustrated in FIG. 6, when the detection chart KT3 for the density unevenness adjustment is printed, the controller 100 causes the camera 72 to capture an image of the detection chart KT3 for the density unevenness adjustment, the detection chart being printed on the print medium 3 (step S3). In a case where the detection chart KT3 does not fit into a region of a capturing range SA3 (FIG. 11) of the camera 72 in the transport direction HY1, the controller 100 divides capturing and executes the divided capturing. In the following description, a case where the detection chart KT3 fits into the region of the capturing range SA3 (FIG. 11) of the camera 72 in the transport direction HY1 is described as an example.

Figure 11:
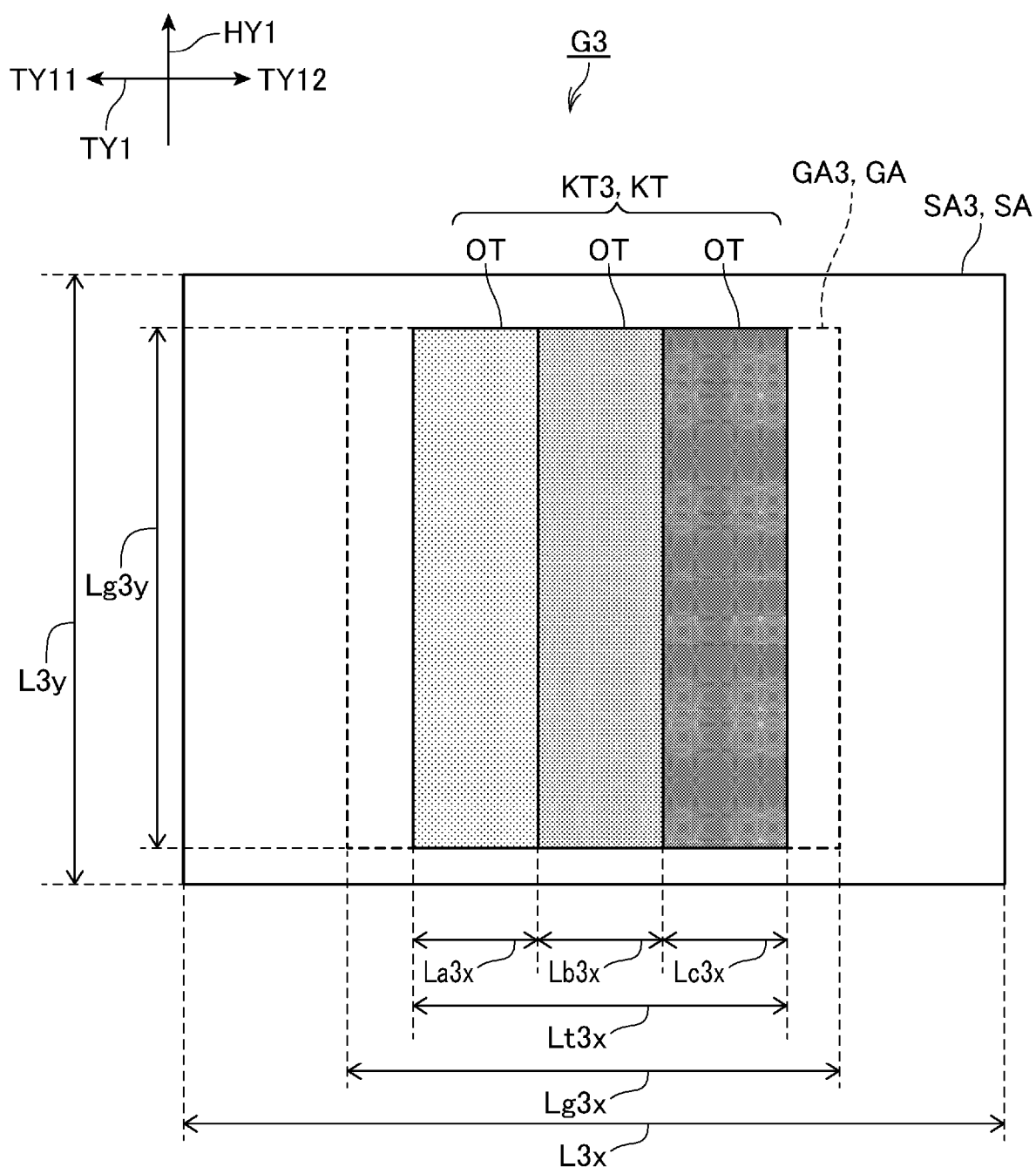
FIG. 11 is a diagram illustrating an example of a captured image of the detection chart for density unevenness adjustment.

FIG. 11 is a diagram illustrating an example of a captured image G3 obtained by capturing the image of the detection chart KT3 for the density unevenness adjustment.

The captured image G3 illustrated in FIG. 11 is a captured image having a region corresponding to the capturing range SA3 of the camera 72. As illustrated in FIG. 11, the captured image G3 is a rectangular-shaped captured image, a length of the captured image G3 in the perpendicular direction TY1 (a direction corresponding to a movement direction of the carriage 6) has a dimension L3x, and a length of the captured image G3 in the transport direction HY1 (a direction corresponding to the transport direction by the transport mechanism 106) has a dimension L3y.

The capturing range SA3 of the captured image G3 corresponds to "γh" illustrated in FIG. 5. Thus, the capturing range SA3 of the captured image G3 is not necessarily the same as the capturing range SA1 of the captured image G1 in the ejection timing adjustment and the capturing range SA2 of the captured image G2 in the ejection amount adjustment. This is the same reason as the reason explained in the ejection amount adjustment. Therefore, preferably, each of the capturing range SA1 in the ejection timing adjustment, the capturing range SA2 in the ejection amount adjustment, and the capturing range SA3 in the density unevenness adjustment is set to an appropriate capturing range SA according to the adjustment item, that is, according to the size of the detection chart KT. That is, in the case of FIG. 5, preferably, the capturing range SA satisfies "αh"≠"βh"≠"γh".

Returning to the explanation of the flowchart illustrated in FIG. 6, when the image of the detection chart KT3 for the density unevenness adjustment is captured, the detection chart being printed on the print medium 3, the controller 100 determines whether to control the image sensor 722 so as to generate captured image data with which a data amount is reduced by the image sensor 722 (step S4).

When the controller 100 determines to generate captured image data with a reduced data amount by the image sensor 722 (YES in step S4), the image sensor 722 generates captured image data with a reduced data amount according to a control from the controller 100 that is input via the camera controller 701 (step S5).

Here, step S5 will be described in detail with reference to FIG. 11.

When reducing the data amount of the captured image data, the image sensor 722 makes the image range GA of the captured image data smaller than the capturing range SA3. In a case of FIG. 11, the image sensor 722 sets a rectangular region of which a length in the perpendicular direction TY1 has a dimension Lg3x and a length in the transport direction HY1 has a dimension Lg3y, as the image range GA3 of the captured image data. That is, the image sensor 722 cuts out the image data of the image range GA3 from the image data of the capturing range SA3, as the captured image data. As illustrated in FIG. 11, the image range GA3 is smaller than the capturing range SA3, and thus the image sensor 722 can reduce the data amount of the captured image data. More specifically, the image sensor 722 generates the captured image data of the image range GA3, and thus the data amount corresponding to "capturing range SA3-image range GA3" can be reduced as compared with the data amount of the image data of the capturing range SA3.

In a case of the image data obtained by capturing an image of the detection chart KT3 for the density unevenness adjustment, the image range GA3 is not limited to a range smaller than the capturing range SA3. When generating a parameter in the density unevenness adjustment, the parameter generator 202 generates a parameter for correcting a dot generation rate for each of dot lines of the detection chart KT3 that are disposed side by side in the transport direction HY1. Therefore, it is required that the image range GA3 is a range including at least a region of the detection chart KT3 of the captured image G3 in the transport direction HY1. That is, in a case of FIG. 11, it is required that the dimension Lg3y which is a length of the image range GA3 in the transport direction HY1 is equal to or larger than the dimension Lt3y which is a length of the detection chart KT3 in the transport direction HY1. Preferably, the dimension Lg3x which is a length of the image range GA3 in the perpendicular direction TY1 is equal to or larger than the dimension Lt3x which is a length of the detection chart KT3 in the perpendicular direction TY1. This is because the parameter generator 202 generates the parameter for each of the band-shaped detection charts OT of the detection chart KT3.

Returning to the explanation of the flowchart illustrated in FIG. 6, when generating the captured image data with the reduced data amount, the image sensor 722 outputs the captured image data to the camera controller 701 according to a control from the controller 100 that is input via the camera controller 701 (step S6). That is, in a case of FIG. 5, the image sensor 722 outputs the captured image data satisfying "γh">"C1h" to the camera controller 701.

Returning to the explanation of step S4 in the flowchart of FIG. 6, when the controller 100 determines not to generate captured image data with a reduced data amount by the image sensor 722 (NO in step S4), the image sensor 722 outputs the image data of the capturing range SA3 to the camera controller 701, as captured image data, according to a control from the controller 100 that is input via the camera controller 701 (step S6). That is, in a case of FIG. 5, the image sensor 722 outputs the captured image data satisfying "γh"="C1h" to the camera controller 701.

Next, when the image sensor 722 outputs the captured image data, the controller 100 determines whether to generate output image data with a reduced data amount by the camera controller 701 (step S7).

When the controller 100 determines to generate output image data with a reduced data amount by the camera controller 701 (YES in step S7), the camera controller 701 reduces the data amount of the output image data according to a control from the controller 100 (step S8). In step S8, the camera controller 701 generates the output image data with a reduced data amount, in the same manner as the generation of the captured image data with the reduced data amount by the image sensor 722. That is, the image range GA3 is smaller than the capturing range SA3, and thus the camera controller 701 can reduce the data amount of the output image data.

Returning to the explanation of the flowchart illustrated in FIG. 6, when generating the output image data with the reduced data amount, the camera controller 701 outputs the output image data to the controller 100 according to a control from the controller 100 (step S9). That is, in the case of FIG. 5, the camera controller 701 outputs the output image data satisfying "γh">"C2h" to the controller 100.

In addition, returning to the explanation of step S7 in the flowchart of FIG. 6, when the controller 100 determines not to reduce the data amount of the output image data (NO in step S7), the camera controller 701 outputs the image data of the capturing range SA3 to the controller 100, as the output image data, according to a control from the controller 100 (step S9). That is, in the case of FIG. 5, the camera controller 701 outputs the output image data satisfying "γh"="C2h" to the controller 100. In addition, in step SA5, in a case where the captured image data with the reduced data amount is generated by the image sensor 722, the camera controller 701 outputs the captured image data with the reduced data amount to the controller 100, as the output image data. That is, in the case of FIG. 5, the camera controller 701 outputs the output image data satisfying "γh">"C2h" to the controller 100.

Next, when the camera controller 701 outputs the output image data, the acquisition generator 201 determines whether to generate generation image data with a reduced data amount (step S10).

When the acquisition generator 201 determines to generate generation image data with a reduced data amount (YES in step S10), the acquisition generator 201 generates generation image data with a reduced data amount (step S11). In step S11, the acquisition generator 201 generates the generation image data with a reduced data amount, in the same manner as the generation of the captured image data with the reduced data amount by the image sensor 722. That is, the image range GA3 is smaller than the capturing range SA3, and thus the acquisition generator 201 can reduce the data amount of the generation image data.

Returning to the explanation of the flowchart of FIG. 6, when generating the generation image data with the reduced data amount, the acquisition generator 201 outputs the generation image data to the parameter generator 202 (step S12). That is, in the case of FIG. 5, the acquisition generator 201 outputs the generation image data satisfying "γh">"C3h" to the parameter generator 202.

In addition, returning to the explanation of step S10 in the flowchart of FIG. 6, when the acquisition generator 201 determines not to reduce the data amount of the generation image data (NO in step S10), the acquisition generator 201 outputs the image data of the image range GA3 to the parameter generator 202, as the generation image data (step S12). When performing step S12, since the data amount is reduced by one of the image sensor 722, the camera controller 701, and the acquisition generator 201, the acquisition generator 201 outputs the image data of the image range GA3 to the parameter generator 202, as the generation image data. That is, in the case of FIG. 5, the acquisition generator 201 outputs the generation image data satisfying "γh">"C3h" to the parameter generator 202.

Next, when the generation image data with the reduced data amount is input from the acquisition generator 201, the parameter generator 202 generates a parameter to be used for the density unevenness adjustment based on the generation image data (step S13). The parameter generator 202 generates a parameter to be used for the density unevenness adjustment by an existing method. For example, the parameter generator 202 calculates a measurement gradation value based on the generation image data by averaging gradation values of the band-shaped detection charts OT for each of the band-shaped detection charts OT of the detection chart KT3. In addition, the parameter generator 202 calculates an average gradation value for each of the band-shaped detection charts OT by averaging gradation values of the dot lines for each dot line (for each dot line formed by disposing the dots side by side in the perpendicular direction TY1) of each of the band-shaped detection charts OT. The parameter generator 202 calculates a parameter for each of the band-shaped detection charts OT such that the average gradation value of the dot lines becomes a value approximate to the measurement gradation value. The parameter is a correction value for correcting the dot generation rate in the dot line.

In this manner, the controller 100 can reduce the data amount of one of the captured image data which is output from the image sensor 722, the output image data which is output from the camera controller 701, and the generation image data which is output from the acquisition generator 201. Thus, for a period from the capturing of the image of the detection chart KT for the density unevenness adjustment to the generation of the parameter, transmission of the image data with the reduced data amount is performed. Therefore, the printing apparatus 1 can shorten a time required to generate the parameter to be used for the density unevenness adjustment. In addition, the printing apparatus 1 can shorten the time required to generate the parameter to be used for the density unevenness adjustment, and thus can shorten a time required for the density unevenness adjustment using the parameter.

As described above, in a case where the density unevenness adjustment is performed as adjustment of the printing apparatus 1, the controller 100 reduces the data amount of the image data by making the image range GA3 smaller than the capturing range SA3. On the other hand, a method of reducing the data amount is not limited to a method of making the image range GA3 of the image data smaller than the capturing range SA3. For example, the data amount of the image data may be reduced by making the image resolution of the image data lower than the capturing resolution. That is, the image sensor 722 may generate the captured image data satisfying γr>C1r. In addition, the camera controller 701 may generate the output image data satisfying γr>C2r. In addition, the acquisition generator 201 may generate the generation image data satisfying γr>C3r. As described above, when generating a parameter in the density unevenness adjustment, the parameter is generated for each dot line. Thus, it is required that the image resolution of the image data is equal to or higher than the printing resolution.

Transport Amount Adjustment

Next, an operation of the printing apparatus 1 in transport amount adjustment will be described with reference to FIG. 6.

The controller 100 of the printing apparatus 1 determines whether or not to start an execution of adjustment of the printing apparatus 1 (step S1). Here, transport amount adjustment is described as an example of adjustment of the printing apparatus 1. Thus, the controller 100 determines whether or not to start an execution of transport amount adjustment (step S1). For example, in a case where the input device 102 detects an operation instructing an execution of transport amount adjustment, the controller 100 determines to start an execution of transport amount adjustment based on the input from the input device 102 (YES in step S1). In addition, for example, in a case where a predetermined time period elapses after the previous execution of transport amount adjustment, the controller 100 determines to start an execution of transport amount adjustment in response to the elapse of the predetermined time period (YES in step S1). In addition, for example, in a case where power is initially supplied to the printing apparatus 1, the controller 100 determines to start an execution of transport amount adjustment in response to the power supply (YES in step S1).

Next, when determining to start an execution of transport amount adjustment (YES in step S1), the controller 100 acquires detection chart data 301 for the transport amount adjustment from the detection chart database 300 stored in the storage 101, and controls the printer 105 and the transport mechanism 106 such that a detection chart KT4 for the transport amount adjustment is printed on the print surface 3a of the print medium 3 (step S2).

Figure 12:
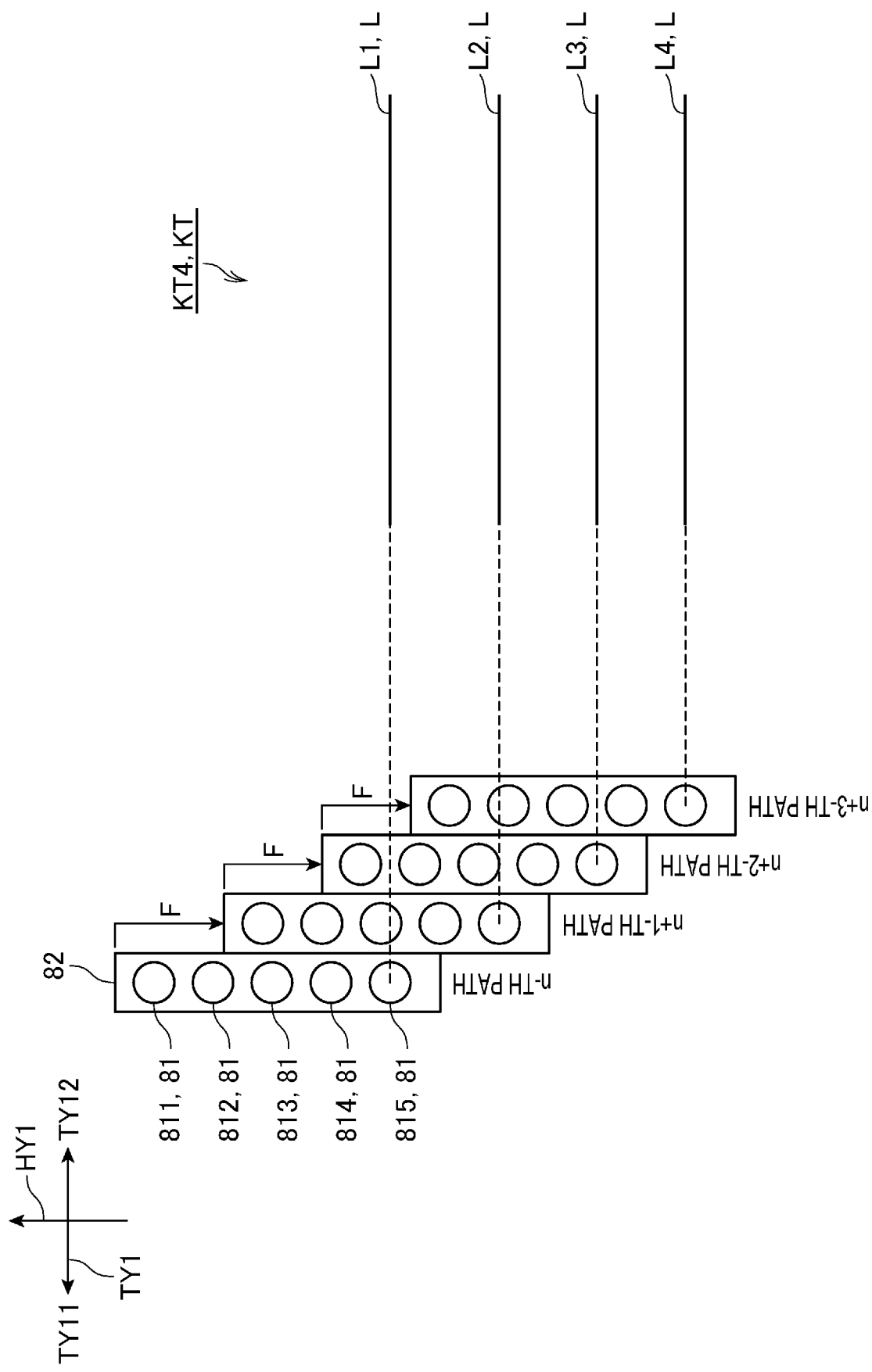
FIG. 12 is a diagram illustrating an example of a detection chart for transport amount adjustment.

FIG. 12 is a diagram illustrating an example of the detection chart KT4 for the transport amount adjustment.

In FIG. 12, for convenience of explanation, the nozzle lines 82 are illustrated together with the detection chart KT4 for the transport amount adjustment. For convenience of explanation, in FIG. 12, one nozzle line 82 among the plurality of nozzle lines 82 is illustrated. In addition, for convenience of explanation, in FIG. 12, it is assumed that the nozzle line 82 includes a nozzle 811, a nozzle 812, a nozzle 813, a nozzle 814, and a nozzle 815. The nozzle is referred to as a nozzle 81 in a case of describing one nozzle 81 without distinguishing the nozzle 811 to the nozzle 815.

As illustrated in FIG. 12, the detection chart KT4 for the transport amount adjustment is a pattern image including a line L1 to a line L4 which extend along the perpendicular direction TY1. Each of the line L1 to the line L4 is printed so as to be disposed side by side along the transport direction HY1. The line is referred to as a line L in a case of describing one line without distinguishing each of the line L1 to the line L4.

The detection chart KT4 for the transport amount adjustment that is illustrated in FIG. 12 is printed as a pattern image including the line L1 to the line L4 by ejecting the ink from the nozzle 815 by four paths. Here, a "path" represents one movement of the carriage 6 in the perpendicular direction TY1.

In FIG. 12, although it is illustrated that the nozzle line 82 moves on the print medium 3, FIG. 12 is a diagram illustrating relative positions between the carriage 6 and the print medium 3, and actually, the print medium 3 moves in the transport direction HY1.

For example, in an n-th path, by the control of the controller 100, the carriage 6 moves from the direction TY11 to the direction TY12, the ink is ejected from the nozzle 815, and the line L1 is printed. Next, by the control of the controller 100, the print medium 3 is transported by a constant transport amount F in the transport direction HY1, in an n+1-th path, the carriage 6 moves from the direction TY12 to the direction TY11, the ink is ejected from the nozzle 815, and the line L2 is printed. Further, by the control of the controller 100, the print medium 3 is transported by a constant transport amount F in the transport direction HY1, in an n+2-th path, the carriage 6 moves from the direction TY11 to the direction TY12, the ink is ejected from the nozzle 815, and the line L3 is printed. Further, by the control of the controller 100, the print medium 3 is transported by a constant transport amount F in the transport direction HY1, in an n+3-th path, the carriage 6 moves from the direction TY12 to the direction TY11, the ink is ejected from the nozzle 815, and the line L4 is printed. In this manner, by the control of the controller 100, the detection chart KT4 illustrated in FIG. 12 is printed on the print medium 3.

Returning to the explanation of the flowchart illustrated in FIG. 6, when the detection chart KT4 for the transport amount adjustment is printed, the controller 100 causes the camera 72 to capture an image of the detection chart KT4 for the transport amount adjustment, the detection chart being printed on the print medium 3 (step S3).

Figure 13:
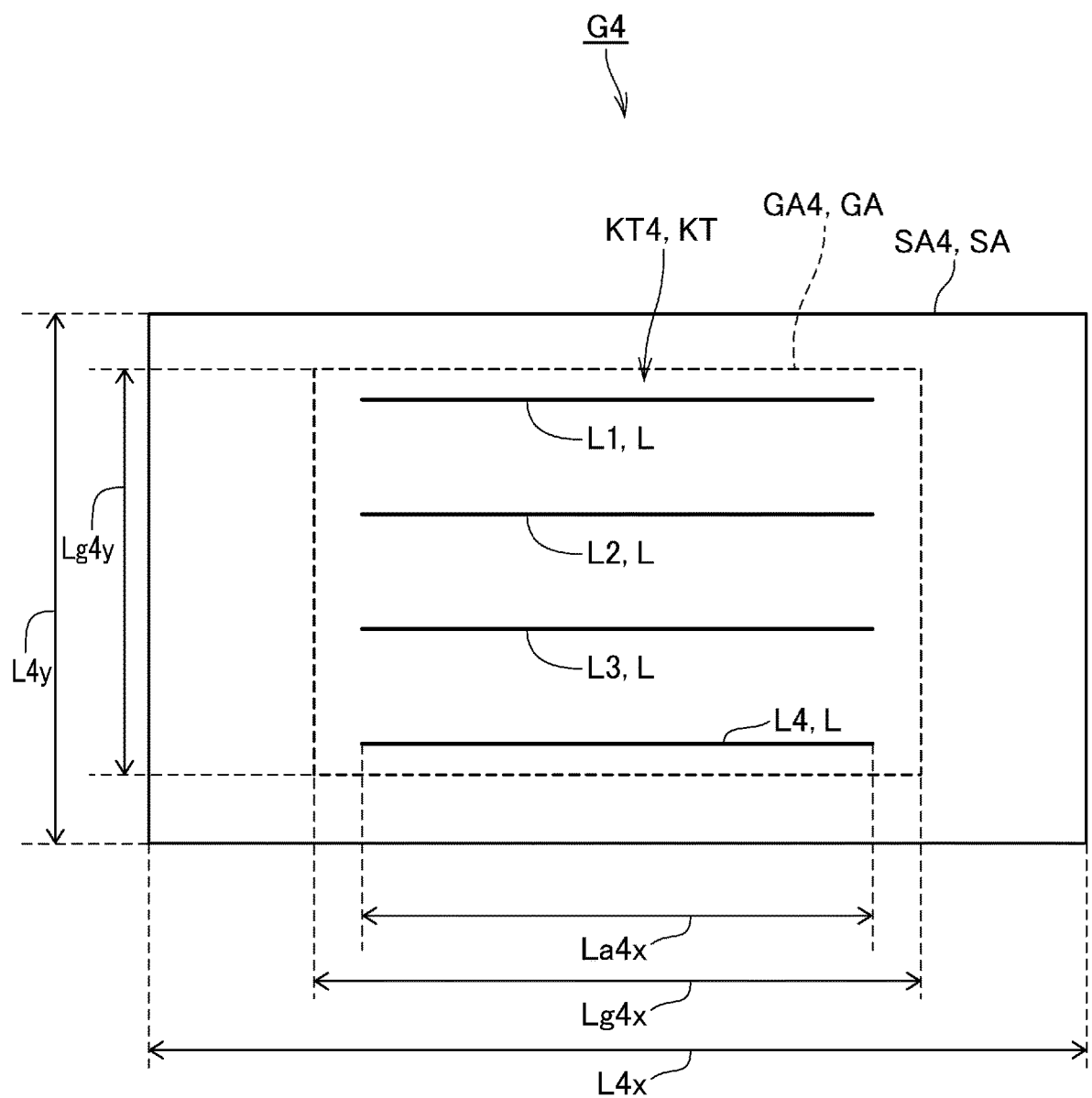
FIG. 13 is a diagram illustrating an example of a captured image of the detection chart for transport amount adjustment.

FIG. 13 is a diagram illustrating an example of a captured image G4 obtained by capturing the image of the detection chart KT4 for the transport amount adjustment.

The captured image G4 illustrated in FIG. 13 is a captured image having a region corresponding to the capturing range SA4 of the camera 72. As illustrated in FIG. 13, the captured image G4 is a rectangular-shaped captured image, a length of the captured image G4 in the perpendicular direction TY1 (a direction corresponding to a movement direction of the carriage 6) has a dimension L4$x$, and a length of the captured image G4 in the transport direction HY1 (a direction corresponding to the transport direction by the transport mechanism 106) has a dimension L4$y$.

The capturing range SA4 of the captured image G4 corresponds to "δh" illustrated in FIG. 5. Thus, the capturing range SA4 of the captured image G4 is not necessarily the same as the capturing range SA1 of the captured image G1 in the ejection timing adjustment, the capturing range SA2 of the captured image G2 in the ejection amount adjustment, and the capturing range SA3 of the captured image G3 in the density unevenness adjustment. This is the same reason as the reason explained in the ejection amount adjustment. Therefore, preferably, each of the capturing range SA1 in the ejection timing adjustment, the capturing range SA2 in the ejection amount adjustment, the capturing range SA3 in the density unevenness adjustment, and the capturing range SA4 in the transport amount adjustment is set to an appropriate capturing range SA according to the adjustment, that is, according to the size of the detection chart KT. That is, in the case of FIG. 5, preferably, the capturing range SA satisfies "αh"≠"βh"≠"γh"≠"δh".

Returning to the explanation of the flowchart illustrated in FIG. 6, when the image of the detection chart KT4 for the density unevenness adjustment is captured, the detection chart being printed on the print medium 3, the controller 100 determines whether to control the image sensor 722 so as to generate captured image data with which a data amount is reduced by the image sensor 722 (step S4).

When the controller 100 determines to generate captured image data with a reduced data amount by the image sensor 722 (YES in step S4), the image sensor 722 generates captured image data with a reduced data amount according to a control from the controller 100 that is input via the camera controller 701 (step S5).

Here, step S5 will be described in detail with reference to FIG. 13.

When reducing the data amount of the captured image data, the image sensor 722 makes the image range of the captured image data smaller than the capturing range SA4. In a case of FIG. 13, the image sensor 722 sets a rectangular region of which a length in the perpendicular direction TY1 has a dimension Lg4$x$ and a length in the transport direction HY1 has a dimension Lg4$y$, as the image range GA4 of the captured image data. That is, the image sensor 722 cuts out the image data of the image range GA4 from the image data of the capturing range SA4, as the captured image data. As illustrated in FIG. 13, the image range GA4 is smaller than the capturing range SA4, and thus the image sensor 722 can reduce the data amount of the captured image data. More specifically, the image sensor 722 generates the captured image data of the image range GA4, and thus the data amount corresponding to "capturing range SA4-image range GA4" can be reduced as compared with the data amount of the image data of the capturing range SA4.

In a case of the image data obtained by capturing an image of the detection chart KT4 for the transport amount adjustment, the image range GA4 is not limited to a range smaller than the capturing range SA4. When generating a parameter in the transport amount adjustment, the parameter generator 202 generates a parameter for correcting the transport amount based on a separation distance between the adjacent lines L in the transport direction HY1. Therefore, it is required that the image range GA4 is a range including at least a plurality of lines L of the detection chart KT4 of the captured image G4. That is, in a case of FIG. 13, it is required that the dimension Lg4y which is a length of the image range GA4 in the transport direction HY1 is a dimension including the plurality of lines L of the detection chart KT4. The dimension Lg4x which is a length of the image range GA4 in the perpendicular direction TY1 may not be equal to or larger than a dimension La4x which is a length of each of the line L1 to the line L4 of the detection chart KT4 in the perpendicular direction TY1. This is because the parameter generator 202 generates a parameter for correcting the transport amount when transporting the print medium 3 in the transport direction HY1. Therefore, the dimension Lg4x which is a length of the image range GA4 in the perpendicular direction TY1 may be a dimension including a part of the line L1 to the line L4 in the perpendicular direction TY1.

Returning to the explanation of the flowchart illustrated in FIG. 6, when generating the captured image data with the reduced data amount, the image sensor 722 outputs the captured image data to the camera controller 701 according to a control from the controller 100 that is input via the camera controller 701 (step S6). That is, in a case of FIG. 5, the image sensor 722 outputs the captured image data satisfying "δh">"D1h" to the camera controller 701.

Returning to the explanation of step S4 in the flowchart of FIG. 6, when the controller 100 determines not to generate captured image data with a reduced data amount by the image sensor 722 (NO in step S4), the image sensor 722 outputs the image data of the capturing range SA3 to the camera controller 701, as captured image data, according to a control from the controller 100 that is input via the camera controller 701 (step S6). That is, in a case of FIG. 5, the image sensor 722 outputs the captured image data satisfying "δh"="D1h" to the camera controller 701.

Next, when the image sensor 722 outputs the captured image data, the controller 100 determines whether to generate output image data with a reduced data amount by the camera controller 701 (step S7).

When the controller 100 determines to generate output image data with a reduced data amount by the camera controller 701 (YES in step S7), the camera controller 701 reduces the data amount of the output image data according to a control from the controller 100 (step S8). In step S8, the camera controller 701 generates the output image data with a reduced data amount, in the same manner as the generation of the captured image data with the reduced data amount by the image sensor 722. That is, the image range GA4 is smaller than the capturing range SA4, and thus the camera controller 701 can reduce the data amount of the output image data.

Returning to the explanation of the flowchart illustrated in FIG. 6, when generating the output image data with the reduced data amount, the camera controller 701 outputs the output image data to the controller 100 according to a control from the controller 100 (step S9). That is, in the case of FIG. 5, the camera controller 701 outputs the output image data satisfying "δh">"D2h" to the controller 100.

In addition, returning to the explanation of step S7 in the flowchart of FIG. 6, when the controller 100 determines not to reduce the data amount of the output image data (NO in step S7), the camera controller 701 outputs the image data of the capturing range SA4 to the controller 100, as the output image data, according to a control from the controller 100 (step S9). That is, in the case of FIG. 5, the camera controller 701 outputs the output image data satisfying "δh"="D2h" to the controller 100. In addition, in step S5, in a case where the captured image data with the reduced data amount is generated by the image sensor 722, the camera controller 701 outputs the captured image data with the reduced data amount to the controller 100, as the output image data. That is, in the case of FIG. 5, the camera controller 701 outputs the output image data satisfying "δh">"D2h" to the controller 100.

Next, when the camera controller 701 outputs the output image data, the acquisition generator 201 determines whether to generate generation image data with a reduced data amount (step S10).

When the acquisition generator 201 determines to generate generation image data with a reduced data amount (YES in step S10), the acquisition generator 201 generates generation image data with a reduced data amount (step S11). In step S11, the acquisition generator 201 generates the generation image data with a reduced data amount, in the same manner as the generation of the captured image data with the reduced data amount by the image sensor 722. That is, the image range GA4 is smaller than the capturing range SA4, and thus the acquisition generator 201 can reduce the data amount of the generation image data.

Returning to the explanation of the flowchart of FIG. 6, when generating the generation image data with the reduced data amount, the acquisition generator 201 outputs the generation image data to the parameter generator 202 (step S12). That is, in the case of FIG. 5, the acquisition generator 201 outputs the generation image data satisfying "δh">"D3h" to the parameter generator 202.

In addition, returning to the explanation of step S10 in the flowchart of FIG. 6, when the acquisition generator 201 determines not to reduce the data amount of the generation image data (NO in step S10), the acquisition generator 201 outputs the image data of the image range GA4 to the parameter generator 202, as the generation image data (step S12). When performing step S12, since the data amount is reduced by one of the image sensor 722, the camera controller 701, and the acquisition generator 201, the acquisition generator 201 outputs the image data of the image range GA4 to the parameter generator 202, as the generation image data. That is, in the case of FIG. 5, the acquisition generator 201 outputs the generation image data satisfying "δh">"D3h" to the parameter generator 202.

Next, when the generation image data with the reduced data amount is input from the acquisition generator 201, the parameter generator 202 generates a parameter to be used for the transport amount adjustment based on the generation image data (step S13). The controller 100 generates a parameter to be used for the transport amount adjustment by an existing method. For example, the parameter generator 202 calculates a separation distance between the line L1 and the line L2, a separation distance between the line L2 and the line L3, and a separation distance between the line L3 and the line L4, based on the generation image data. The parameter generator 202 calculates a difference between each of the calculated separation distances and the transport amount F. Originally, when the print medium is appropriately transported, each of the calculated separation distances is the same as the transport amount F. Therefore, by calculating the difference, it is possible to calculate an error of the transport amount. The parameter generator 202 calculates differences between each of the separation distances and the transport amount F, averages the differences, and sets the averaged difference as a parameter for the transport amount adjustment.

In this manner, the controller 100 can reduce the data amount of one of the captured image data which is output from the image sensor 722, the output image data which is output from the camera controller 701, and the generation image data which is output from the acquisition generator 201. Thus, for a period from the capturing of the image of the detection chart KT4 for the transport amount adjustment to the generation of the parameter, transmission of the image data with the reduced data amount is performed. Therefore, the printing apparatus 1 can shorten a time required up to generate a parameter to be used for the transport amount adjustment. In addition, the printing apparatus 1 can shorten a time required for generating a parameter to be used for the transport amount adjustment. Thus, it is possible to shorten a time required for the transport amount adjustment using the parameter.

As described above, in a case where the transport amount adjustment is performed as adjustment of the printing apparatus 1, the controller 100 reduces the data amount of the image data by making the image range GA4 smaller than the capturing range SA4. On the other hand, a method of reducing the data amount is not limited to a method of making the image range GA4 of the image data smaller than the capturing range SA4. For example, the data amount of the image data may be reduced by making the resolution of the image data lower than the capturing resolution. That is, the image sensor 722 may generate the captured image data satisfying $\delta r > D1r$. In addition, the camera controller 701 may generate the output image data satisfying $\delta r > D2r$. In addition, the acquisition generator 201 may generate the generation image data satisfying $\delta r > D3r$.

As described above, the controller 100 generates the image data of the image range GA smaller than the capturing range SA of the camera or the image data of the image resolution lower than the capturing resolution, for each adjustment item. Thereby, the controller 100 can shorten a time required for adjustment related to printing of the printing apparatus 1 for each adjustment item. In particular, when executing a plurality of adjustments in a series of flows, the controller 100 exhibits the following effects. As described above, when the image range GA is the same for each adjustment item, image data of an unnecessarily-wide image range GA, that is, image data with an unnecessarily-large data amount, is transmitted. Therefore, by generating the image data of the image range GA smaller than the capturing range SA of the camera 72 or the image data of the image resolution lower than the capturing resolution for each adjustment item related to printing, the controller 100 can further shorten the time required for executing a plurality of adjustments in a series of flows.

In addition, as described above, preferably, the printing apparatus 1 sets the capturing range SA to be different for each adjustment item related to printing by the printing apparatus 1. That is, preferably, the printing apparatus 1 performs a control so as to satisfy "αh"≠"βh"≠"γh"≠"δh". When all of the capturing ranges SA are set to be the same, capturing is performed at the same-sized capturing range SA regardless of the size of the detection chart, and as a result, the capturing range SA unnecessarily widens and the data amount of the image data unnecessarily increases depending on the detection chart KT. When the capturing range SA unnecessarily widens and the data amount of the image data unnecessarily increases, in some cases, it may take more time to transmit the image data or it may take more time to cut out the image data. Therefore, by setting the capturing range SA to be different for each adjustment item of the printing apparatus 1, the printing apparatus 1 can further shorten a time required for adjustment. In addition, the printing apparatus 1 may set the capturing resolution to be different for each adjustment item related to printing by the printing apparatus 1. That is, the printing apparatus 1 may perform a control so as to satisfy "αr"≠"βr"≠"γr"≠"δr". Similar to the reason why the capturing range SA is set to be different for each adjustment item of the printing apparatus 1, when the capturing resolutions are the same, there is a possibility that the data amount of the image data unnecessarily increases. Therefore, by setting the capturing resolution to be different for each adjustment item of the printing apparatus 1, the printing apparatus 1 can further shorten a time required for adjustment.

In the above description, the reason why the capturing range SA is set to be different for each adjustment item is described. On the other hand, the printing apparatus 1 may set the image range GA of the captured image data, the image range GA of the output image data, and the image range GA of the generation image data to be different for each adjustment item. That is, the printing apparatus 1 may perform a control so as to satisfy "A1h"≠"B1h"≠"C1h"≠"D1h", "A2h"≠"B2h"≠"C2h"≠"D2h", and "A3h"≠"B3h"≠"C3h"≠"D3h". In this manner, by setting the image range GA of the captured image data, the image range GA of the output image data, and the image range GA of the generation image data to be different for each adjustment item, the printing apparatus 1 can prevent the data amount of the image data from unnecessarily increasing depending on the adjustment item. Thus, it is possible to shorten a time required for adjustment.

In addition, in a case where the camera 72 captures an image of the detection chart KT by executing capturing at a predetermined frame rate, the camera controller 701 may set the frame rate to be different for each adjustment item related to printing by the printing apparatus 1. As a mode in which the camera 72 executes capturing at predetermined frame rates, there is a mode in which the printing apparatus 1 monitors presence or absence of the detection chart KT based on the captured image captured by the camera 72 and generates a parameter to be used for adjustment in a case where the detection chart KT is included in the captured image. Here, by setting the frame rate to be different, the camera controller 701 can change the number of pieces of image data transmitted per unit time. Therefore, by setting the frame rate of the camera 72 to be different for each adjustment item of the printing apparatus 1, the camera controller 701 can reduce an amount of data transmitted per unit time in image data transmission, and thus it is possible to shorten a time required for adjustment.

In addition, in the above-described operation, a configuration for reducing the data amount between the image sensor 722 and the camera controller 701, between the camera controller 701 and the controller 100, or between the acquisition generator 201 and the parameter generator 202 is described. On the other hand, when transmitting the image data, the data amount of the image data may be sequentially reduced at target portions at which the data amount is reduced. Even in this case, the same effects as the above-described effects are obtained. In addition, preferably, the data amount of the image data is reduced at a portion between the image sensor 722 and the camera controller 701, among the target portions at which the data amount is reduced. This is because, when the data amount is reduced between the image sensor 722 and the camera controller 701, it is possible to shorten a time required for transmission of the subsequent image data, and thereby further reducing the time.

As described above, the printing apparatus 1 includes an ink jet head 8 (print head) that executes printing on the print medium 3, a camera 72 that captures an image on the print medium 3, a carriage 6 that includes the ink jet head 8 and the camera 72, and a controller 100 that generates image data based on the captured image obtained by capturing an image of a detection chart KT by the camera 72, the detection chart being printed on the print medium 3 by the ink jet head 8. The controller 100 generates at least one of image data representing an image of an image range GA smaller than a capturing range SA of the camera 72 and image data representing an image of an image resolution lower than a capturing resolution of the captured image, for each of a plurality of adjustment items related to printing.

In this configuration, for each of the plurality of adjustment items, at least one of the image data representing an image of the image range GA smaller than the capturing range SA of the camera and the image data representing an image of the image resolution lower than the capturing resolution of the captured image are generated. Therefore, the controller 100 can reduce the data amount of the image data of the detection chart KT for each of the plurality of adjustment items, and thus it is possible to shorten a time required for adjustment based on the detection chart KT.

In addition, the camera 72 includes an image sensor 722 and a camera controller 701. The image sensor 722 generates captured image data which is image data representing the captured image, and outputs the captured image data to the camera controller 701. The camera controller 701 generates output image data which is image data to be output to the controller 100 based on the captured image data, and outputs the output image data to the controller 100. The controller 100 generates generation image data based on the output image data, the generation image data being image data for generating a parameter to be used for adjustment based on the adjustment item related to printing by the printing apparatus 1.

In this configuration, in the printing apparatus 1, the image sensor 722 generates captured image data and outputs the captured image data to the camera controller 701, the camera controller 701 generates output image data and outputs the output image data to the controller 100, and the controller 100 generates generation image data. Therefore, at least one of when the image sensor 722 generates the captured image data, when the camera controller 701 generates the output image data, and when the controller 100 generates the generation image data, it is possible to reduce the data amount of the image data.

In addition, the acquisition generator 201 of the controller 100 generates the generation image data based on the image range GA or the image resolution which is set to be different for each of the plurality of adjustment items related to printing.

In this configuration, the generation image data is generated based on the image range GA or the image resolution which is set to be different for each of the plurality of adjustment items. Thus, the acquisition generator 201 can reduce the data amount of the image data of the detection chart KT for each of the plurality of adjustment items. Therefore, the printing apparatus 1 can shorten a time required for adjustment based on the detection chart KT.

In addition, the controller 100 controls the camera controller 701 to generate the output image data based on the image range GA or the image resolution which is set to be different for each of the plurality of adjustment items related to printing.

In this configuration, the output image data is generated based on the image range GA or the image resolution which is set to be different for each of the plurality of adjustment items. Thus, the camera controller 701 can reduce the data amount of the image data of the detection chart KT for each of the plurality of adjustment items. Therefore, the printing apparatus 1 can shorten a time required for adjustment based on the detection chart KT.

In addition, the controller 100 controls the image sensor 722 to generate the captured image data based on the image range GA or the image resolution which is set to be different for each of the plurality of adjustment items related to printing.

In this configuration, the captured image data is generated based on the image range GA or the image resolution which is set to be different for each of the plurality of adjustment items. Thus, the image sensor 722 can reduce the data amount of the image data of the detection chart KT for each of the plurality of adjustment items. The image sensor 722 can shorten a time required for adjustment based on the detection chart KT.

In addition, the camera controller 701 causes the camera 72 to capture an image of the detection chart KT based on the frame rate which is set to be different for each of the plurality of adjustment items related to printing.

In this configuration, the camera controller 701 causes the camera 72 to capture an image of the detection chart KT based on the frame rate which is set to be different for each of the plurality of adjustment items. Thus, it is possible to capture an image of the detection chart KT at a frame rate corresponding to the adjustment item. Therefore, by setting the frame rate of the camera 72 to be different for each adjustment item of the printing apparatus 1, the camera controller 701 can reduce an amount of data transmitted per unit time in image data transmission, and thus it is possible to shorten a time required for adjustment.

In addition, the ink jet head 8 includes nozzles 81 for ejecting an ink. The controller 100 adjusts at least one of a timing of ejecting the ink from the nozzles 81 and an amount of the ink ejected from the nozzles 81 based on the parameter which is generated based on the generation image data. That is, the controller 100 executes at least one of the ejection timing adjustment and the ejection amount adjustment.

In this configuration, the printing apparatus 1 can shorten a time required for generating a parameter to be used for at least one adjustment of adjustment of an ink ejection timing from the nozzles 81 and adjustment of an ink ejection amount from the nozzles 81. Thus, it is possible to shorten a time required for the adjustments.

In addition, the printing apparatus 1 includes a transport mechanism 106 that transports the print medium 3. The controller 100 adjusts a transport amount of the print medium 3 by the transport mechanism 106 based on the parameter which is generated based on the generation image data. That is, the controller 100 executes transport amount adjustment.

In this configuration, the printing apparatus 1 can shorten a time required for generating a parameter to be used for the transport amount adjustment. Thus, it is possible to shorten a time required for the transport amount adjustment.

The above-described embodiments have been presented by way of example only, and can be freely modified and applied within the scope of the invention.

For example, in the above-described embodiment, as the adjustment items (adjustments) related to printing of the printing apparatus 1, the ejection timing adjustment, the ejection amount adjustment, the density unevenness adjustment, and the transport amount adjustment are described. The adjustment of the printing apparatus 1 is not limited to the adjustments. The adjustment items of the printing apparatus 1 may include more adjustments. In this case, the controller 100 causes the printer 105 to print a detection chart KT according to the adjustment on the print medium 3. The controller 100 generates at least one of image data representing an image of an image range GA smaller than a capturing range SA of the camera 72 and image data representing an image of an image resolution lower than a capturing resolution of the captured image, according to the adjustment.

In addition, each of the detection charts KT illustrated in each drawing is merely an example, and is not limited to the configuration illustrated in each drawing. For example, the detection chart KT1 may include more ruled lines. In addition, the detection chart KT2 may include detection charts KT21 having more various densities and more different colors. In addition, the detection chart KT3 may include more band-shaped detection charts OT. In addition, the detection chart KT4 may include more lines L.

In addition, for example, in a case where a control method of the printing apparatus 1 is realized by using a computer included in the printing apparatus 1, the invention may be configured in a form of a program to be executed by a computer to realize the control method, and a computer-readable recording medium in which the program is recorded to be readable by the computer or a transmission medium for transmitting the program. As the recording medium, a magnetic recording medium, an optical recording medium, or a semiconductor memory device may be used. More specifically, a flexible disk, a hard disk drive (HDD), a compact disk read only memory (CD-ROM), a digital versatile disk (DVD), a Blu-ray (registered trademark) disc, a magneto-optical disk, a flash memory, a portable type recording medium such as a card type recording medium, or a fixed type recording medium may be used. In addition, the recording medium may be a non-volatile memory device such as a read only memory (ROM) or an HDD which is an internal memory device of the printing apparatus 1.

In addition, for easy understanding of the invention, functional blocks described with reference to FIG. 4 are schematically illustrated by classifying a functional configuration of each device according to main processing contents. The configuration of each device may be classified into more components according to the processing contents. In addition, the configuration of each device may be classified such that one component performs more processing. In addition, processing in each component may be executed by one piece of hardware, or may be executed by a plurality of pieces of hardware. In addition, processing in each component may be realized by one program, or may be realized by a plurality of programs.

In the flowchart illustrated in FIG. 6, for easy understanding of the processing in the printing apparatus 1, processing units are divided according to the main processing contents. The invention is not limited by a division manner and a division name of the processing units. The processing of the printing apparatus 1 may be divided into more processing units according to the processing contents. The processing of the printing apparatus 1 may be divided such that one processing unit includes more processing. In addition, as long as the same processing can be performed, an order of processing in the flowchart is not limited to the example illustrated in the drawings.

What is claimed is:

1. A printing apparatus comprising:
a print head configured to print on a print medium;
a transport mechanism configured to transport the print medium;
a camera configured to capture an image on the print medium such that an image range of the captured image corresponds to a predetermined capturing range of the camera wherein the predetermined capturing range of the camera includes a distance in a transport direction of transporting the print medium by the transport mechanism;
a carriage configured to mount the print head and the camera; and
a processor configured to generate image data based on a captured image obtained by capturing a chart by the camera, the chart being printed on the print medium by the print head,
wherein the processor is configured to generate captured image data by cutting out the captured image data from image data of the predetermined capturing range of the camera such that the captured image data represents an image having an image range smaller than the predetermined capturing range of the camera, wherein the image range includes a first length in the transport direction and a second length in a moving direction of the carriage, and
wherein the image range is different for each of a plurality of adjustment items of the printing apparatus, the plurality of adjustment items comprising at least one of ejection timing adjustment, ejection amount adjustment, density unevenness adjustment, or transport amount adjustment.

2. The printing apparatus according to claim 1,
wherein the camera is configured to include an image sensor and a camera processor,
wherein the image sensor is configured to generate the captured image data representing the captured image and output the captured image data to the camera processor,
wherein the camera processor is configured to generate output image data to be output to the processor based on the captured image data and output the output image data to the processor, and
wherein the processor is configured to generate generation image data for generating a parameter to be used for adjustment according to an adjustment item based on the output image data.

3. The printing apparatus according to claim 2,
wherein the processor is configured to generate the generation image data based on the image range which is set to be different for the adjustment item.

4. The printing apparatus according to claim 2,
wherein the processor is configured to generate the output image data based on the image range which is set to be different for the adjustment item.

5. The printing apparatus according to claim 2,
wherein the processor is configured to generate the captured image data based on the image range which is set to be different for the adjustment item.

6. The printing apparatus according to claim 2,
wherein the camera processor is configured to cause the camera to capture an image of the chart based on a frame rate which is set to be different for the adjustment item.

7. The printing apparatus according to claim 2,
wherein the print head is configured to include a nozzle for ejecting an ink, and
wherein the processor is configured to adjust at least one of a timing of ejecting the ink from the nozzle or an amount of the ink ejected from the nozzle, based on the parameter which is generated based on the generation image data.

8. The printing apparatus according to claim 2, wherein the processor is configured to adjust a transport amount of the print medium by the transport mechanism based on the parameter which is generated based on the generation image data.

9. The printing apparatus according to claim 1,
wherein the processor is further configured to generate image data representing an image of a resolution lower than a resolution of the captured image, for an adjustment item related to printing.

10. A control method of a printing apparatus configured to include a carriage, the carriage mounting a print head which prints on a print medium, a transport mechanism that transports the print medium, and a camera which captures an image on the print medium such that an image range of the captured image corresponds to a predetermined capturing range of the camera, the method comprising:
capturing, by the camera, an image on the print medium such that an image range of the captured image corresponds to a predetermined capturing range of the camera, wherein the predetermined capturing range includes a distance in a transport direction of transporting the print medium by the transport mechanism; and
generating captured image data by cutting out the captured image data from image data of the predetermined capturing range of the camera such that the captured image data represents an image having an image range smaller than the capturing range of the camera, based on the captured image obtained by capturing an image of a chart by the camera, the chart being printed on the print medium by the print head, wherein the image range includes a first length in the transport direction and a second length in a moving direction of the carriage,
wherein the image range is different for each of a plurality of adjustment items of the printing apparatus, the plurality of adjustment items comprising at least one of ejection timing adjustment, ejection amount adjustment, density unevenness adjustment, or transport amount adjustment.

11. The control method of a printing apparatus according to claim 10, further comprising:
generating the captured image data representing the captured image;
generating output image data based on the captured image data; and
generating generation image data for generating a parameter based on the output image data, the parameter being to be used for adjustment based on an adjustment item.

12. The control method of a printing apparatus according to claim 11, further comprising:
setting, when generating the generation image data, the image range to be different for the adjustment item.

13. The control method of a printing apparatus according to claim 11, further comprising:
setting, when generating the output image data, the image range to be different for the adjustment item.

14. The control method of a printing apparatus according to claim 11, further comprising:
setting, when generating the captured image data, the image range to be different for the adjustment item.

15. The control method of a printing apparatus according to claim 11, further comprising:
setting wherein, when capturing the image of the chart by the camera, a frame rate to be different for the adjustment item.

16. The control method of a printing apparatus according to claim 11,
wherein the print head includes a nozzle for ejecting an ink, and
wherein the control method further comprises:
adjusting at least one of a timing of ejecting the ink from the nozzle or an amount of the ink ejected from the nozzle based on the parameter which is generated based on the generation image data.

17. The control method of a printing apparatus according to claim 11,
wherein the control method further comprises:
adjusting a transport amount of the print medium by the transport mechanism based on the parameter which is generated based on the generation image data.

18. The control method of a printing apparatus according to claim 10, further comprising:
generating image data representing an image of a resolution lower than a resolution of the captured image, for an adjustment item related to printing.

* * * * *